United States Patent
Redmann

(10) Patent No.: US 9,600,923 B2
(45) Date of Patent: Mar. 21, 2017

(54) SCALE-INDEPENDENT MAPS

(75) Inventor: William Gibbens Redmann, Glendale, CA (US)

(73) Assignee: Thomson Licensing, Issy les moulineaux (FR)

( * ) Notice: Subject to any disclaimer, the term of this patent is extended or adjusted under 35 U.S.C. 154(b) by 102 days.

(21) Appl. No.: 14/119,962

(22) PCT Filed: Dec. 5, 2011

(86) PCT No.: PCT/US2011/063223
§ 371 (c)(1),
(2), (4) Date: Nov. 25, 2013

(87) PCT Pub. No.: WO2012/161734
PCT Pub. Date: Nov. 29, 2012

(65) Prior Publication Data
US 2014/0125660 A1    May 8, 2014

Related U.S. Application Data

(60) Provisional application No. 61/490,179, filed on May 26, 2011, provisional application No. 61/626,496, filed on Sep. 27, 2011.

(51) Int. Cl.
*H04N 13/00* (2006.01)
*G06T 15/04* (2011.01)
*G06T 3/40* (2006.01)

(52) U.S. Cl.
CPC .............. *G06T 15/04* (2013.01); *G06T 3/40* (2013.01); *H04N 13/0022* (2013.01); *H04N 13/0029* (2013.01)

(58) Field of Classification Search
None
See application file for complete search history.

(56) References Cited

U.S. PATENT DOCUMENTS 5,025,325 A * 6/1991 Hudson .................. G06K 15/00
358/447
5,926,567 A * 7/1999 Collins .................. G06T 11/203
345/428

(Continued)

FOREIGN PATENT DOCUMENTS

CN    1153362    7/1997
CN    1132123    12/2003

(Continued)

OTHER PUBLICATIONS

Sasaki et al., "Window-based Stereo Matching Algorithm Using a Weighted Average of Costs Aggregated with Window Size Reduction", Japan, pp. 1-4. Jan. 27, 2007, http://www.rcns.hiroshima-u.ac.jp/21coe/J/9doc/doc6.html.

(Continued)

*Primary Examiner* — Gregory J Tryder
*Assistant Examiner* — Diane Wills
(74) *Attorney, Agent, or Firm* — Brian J. Dorini; Xiaoan Lu

(57) ABSTRACT

Various implementations provide a resolution-specific attribute for a resolution-invariant region. Several implementations provide an SCM-based disparity value for scale-invariant cells. Particular implementations provide a signal or structure that includes such an attribute. Yet further implementations access such an attribute, and process the attribute. One particular implementation accesses an attribute for a region of a picture. The region is coextensive with a first integer number of pixels in a particular resolution, and with a second integer number of pixels in a second resolution. The attribute is specific to the region and to a combination resolution determined as a combination of the particular resolution and the second resolution. The attribute is converted to provide an attribute specific to the particular resolution. The converted attribute is associated with the first (Continued)

integer number of pixels. Other implementations use the converted attribute in post-processing operations, such as, for example, subtitle placement using disparity information.

33 Claims, 17 Drawing Sheets

(56) References Cited

U.S. PATENT DOCUMENTS

| | | | |
|---|---|---|---|
| 6,515,663 | B1 | 2/2003 | Hung et al. |
| 7,092,003 | B1 | 8/2006 | Siegel et al. |
| 7,738,712 | B2 | 6/2010 | Tzeng et al. |
| 8,090,195 | B2 | 1/2012 | Oyama |
| 8,374,463 | B1 | 2/2013 | Anderson et al. |
| 2001/0045979 | A1* | 11/2001 | Matsumoto ............ G06K 9/20 348/43 |
| 2002/0145610 | A1 | 10/2002 | Barilovits et al. |
| 2002/0181738 | A1 | 12/2002 | Nakamura et al. |
| 2005/0132191 | A1 | 6/2005 | Joshi et al. |
| 2006/0290778 | A1 | 12/2006 | Kitaura et al. |
| 2007/0047040 | A1 | 3/2007 | Ha |
| 2007/0229653 | A1 | 10/2007 | Matusik et al. |
| 2008/0043095 | A1 | 2/2008 | Vetro et al. |
| 2008/0043096 | A1 | 2/2008 | Vetro |
| 2008/0112616 | A1 | 5/2008 | Koo et al. |
| 2008/0136819 | A1 | 6/2008 | Shivas et al. |
| 2008/0240549 | A1 | 10/2008 | Koo et al. |
| 2009/0096863 | A1 | 4/2009 | Kim et al. |
| 2009/0244066 | A1 | 10/2009 | Sugita et al. |
| 2010/0002948 | A1 | 1/2010 | Gangwal et al. |
| 2011/0123068 | A1 | 5/2011 | Miksa et al. |
| 2012/0084652 | A1* | 4/2012 | Martinez Bauza H04N 13/0007 715/719 |
| 2012/0314771 | A1* | 12/2012 | Lim ..................... H04N 19/117 375/240.16 |
| 2013/0077853 | A1* | 3/2013 | Chauvier ........... H04N 13/0022 382/154 |
| 2014/0334555 | A1 | 11/2014 | Zhang |

FOREIGN PATENT DOCUMENTS

| | | |
|---|---|---|
| CN | 1774937 | 5/2006 |
| CN | 101184252 | 5/2008 |
| CN | 101547376 | 9/2009 |
| EP | 0422793 | 4/1991 |
| EP | 0735512 | 10/1996 |
| EP | 1617684 | 1/2006 |
| EP | 1662809 | 5/2006 |
| EP | 1686808 | 8/2006 |
| EP | 1978754 | 8/2008 |
| EP | 1968329 | 9/2008 |
| EP | 1978755 | 10/2008 |
| GB | 2479784 | 10/2011 |
| JP | 11127339 | 5/1995 |
| JP | 8018954 | 1/1996 |
| JP | 2000321050 | 11/2000 |
| JP | 2001306287 | * 11/2001 |
| JP | 2002320083 | 10/2002 |
| JP | 2005073049 | 3/2005 |
| JP | 2008167282 | 7/2008 |
| JP | 2008257686 | 10/2008 |
| JP | 2008259171 | 10/2008 |
| JP | 2009518877 | 5/2009 |
| JP | 2009278495 | 11/2009 |
| JP | 2010098700 | 4/2010 |
| JP | 2015505196 | 2/2015 |
| KR | 2004018859 | 3/2004 |
| KR | 100727940 | 6/2007 |
| KR | 100778085 | 11/2007 |
| KR | 2009077515 | 7/2009 |
| TW | 421969 | 2/2001 |
| TW | 452757 | 9/2001 |
| TW | 200737038 | 10/2007 |
| TW | 201101839 | 1/2011 |
| WO | WO2005020591 | 3/2005 |
| WO | WO2007057497 | 5/2007 |
| WO | WO2007119666 | 10/2007 |
| WO | WO2009083863 | 7/2009 |
| WO | WO2010064118 | 6/2010 |
| WO | WO2010064784 | 6/2010 |
| WO | WO2011121437 | 10/2011 |
| WO | WO2012161734 | 11/2012 |

OTHER PUBLICATIONS

Tong et al., "A Novel Object-Oriented Stereo Matching on Multi-scale Superpixels for Low-Resolution Depth Mapping", 32nd Annual International Conference on the IEEE EMBS, Buenos Aires, Argentina, Aug. 31-Sep. 4, 2010, pp. 5046-5049.

Jones et al., "Controlling Perceived Depth in Stereoscopic Images," Sharp Laboratories of Europe Ltd., pp. 1-12.

Gehrig et al , "Improving Stereo Sub-Phrei Accuracy for Long Range Stereo," 2007 11th IEEE Int'l. Conference on Computer Vision. Oct. 14-21, 2007, pp. 1-7.

Garcia et al., "Pixel Weighted Average Strategy for Depth Sensor Data Fusion", Proceedings of 2010 IEEE 17th International Conference on Image Processing, Hong Kong, Sep. 27-29, 2010, pp. 2805-2808.

Sasaki et al., "Stereo Matching Algorithm Using a Weighted Average of Costs Aggregated by Various Window Sizes", ACCV 2006, LNCS 3852, pp. 771-780, 2006.

Lambooij et al., "Visual Discomfort and Visual Fatigue of Stereoscopic Displays: A Review," Journal of Imaging Science and Technology, 53(3), May-Jun. 2009, Society for Imaging Science and Technology 2009, pp. 1-14.

Lambooij et al., "Visual Discomfort in Stereoscopic Displays: A Review," Human Technology Interactions Group, Dept of Technology, Einhoven, Netherlands, SPIE-TS&T/vol. 6490, 2007, pp. 1-13.

Search Reported Dated Mar. 2, 2012.

* cited by examiner $$11{,}520 = \underbrace{2^8 \cdot 3^2 \cdot 5}_{720}\ \underbrace{\phantom{xxxx}}_{730}$$

$710 \downarrow$ $960 = 2^6 \cdot 3 \cdot 5 \quad = 11{,}520 / 12$ $1280 = 2^6 \cdot 3^0 \cdot 5 \quad = 11{,}520 / 9$ $1440 = 2^5 \cdot 3^2 \cdot 5 \quad = 11{,}520 / 8$ $1920 = 2^7 \cdot 3 \cdot 5 \quad = 11{,}520 / 6$ $2048 = 2^{11} \quad\quad\quad = 11{,}520 \cdot 8/45$ $4096 = 2^{12} \quad\quad\quad = 11{,}520 \cdot 16/45$ $8192 = 2^{13} \quad\quad\quad = 11{,}520 \cdot 32/45$

|     |     |     |     |     |
| --- | --- | --- | --- | --- |
| P11 | P12 | P13 |     |     |
| P14 | P15 | P16 |     |     |
| P17 | P18 | P19 |     |     |
|     |     |     |     |     |
|     |     |     |     |     |

Map 1

*FIG. 11*

|     |     |     |
| --- | --- | --- |
| P21 | P22 |     |
| P23 | P24 |     |
|     |     |     |

Map 2

SCALE-INDEPENDENT MAPS

CROSS-REFERENCE TO RELATED APPLICATIONS

This application claims the benefit, under 35 U.S.C. §365 of International Application PCT/US2011/063223, filed Dec. 5, 2011, which was published in accordance with PCT Article 21(2) on Nov. 29, 2012 in English and which claims the benefit of U.S. provisional patent application No. 61/490,179, filed May 26, 2011 and U.S. provisional patent application No. 61/626,496, filed Sep. 27, 2011.

TECHNICAL FIELD

Implementations are described that relate to providing information for digital pictures. Various particular implementations relate to disparity maps for video images.

BACKGROUND

Stereoscopic video provides two video images, including a left video image and a right video image. Depth and/or disparity information may also be provided for these two video images. The depth and/or disparity information may be used for a variety of processing operations on the two video images.

SUMMARY

According to a general aspect, an attribute is determined for a region of a picture. The picture has a particular resolution and the attribute is specific to the particular resolution and to the region. The region of the picture is coextensive with a first integer number of pixels in the particular resolution, and coextensive with a second integer number of pixels in a second resolution. The attribute is converted to provide an attribute specific to the region and to a combination resolution determined as a combination of the particular resolution and the second resolution.

According to another general aspect, a signal or structure includes an attribute portion. The attribute portion includes data indicating an attribute for a region of a picture. The attribute is specific to the region and to a combination resolution. The combination resolution is determined as a combination of a particular resolution and a second resolution. The region of the picture is coextensive with a first integer number of pixels in the particular resolution, and coextensive with a second integer number of pixels in the second resolution.

According to another general aspect, an attribute is accessed for a region of a picture. The region of the picture is coextensive with a first integer number of pixels in a particular resolution, and coextensive with a second integer number of pixels in a second resolution. The attribute is specific to the region and to a combination resolution determined as a combination of the particular resolution and the second resolution. The attribute is converted to provide an attribute specific to the region and to the particular resolution. The converted attribute is associated with the first integer number of pixels in the particular resolution.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 11 is a block/pictorial representation of a first of the pixel grid examples of FIG. 10 in isolation.

FIG. 12 is a block/pictorial representation of a second of the pixel grid examples of FIG. 10 in isolation.

DETAILED DESCRIPTION

As a preview of some of the features presented in this application, at least one implementation describes the use of a disparity map that provides one or more disparity values that each apply to a corresponding cell (multiple pixels). The actual disparity values are based on a resolution considerably larger than any standard display's largest resolution, and referred to as a non-standard resolution. In this application, the term "resolution" generally refers to the horizontal resolution but is also used to refer to the vertical resolution and/or to both horizontal and vertical resolution, and is measured in, for example, number of pixels of a display or number of blocks of pixels of a display, or number of elements of a digital image. The non-standard resolution is an integer that is easily converted to one or more of several standard display resolutions. In this particular implementation, the effective display resolution is the smallest common multiple of several standard display resolutions. The disparity values for the effective display resolution are represented in integer format. The disparity values are potentially large as a result of being based on a large non-display resolution. Yet, the integer representations provide for sub-pixel accuracy when the disparity values are converted down to a standard display resolution. Additionally, the cell size and location is coextensive with an integer number of pixels in two or more resolutions. The actual integer number is different in the different resolutions. This size and location, and the use of a single disparity value for the entire cell, allows the cell disparity value to remain the same when the resolution is changed. However, the disparity value will be associated with varying numbers of pixels in the different resolutions.

Figure 1:
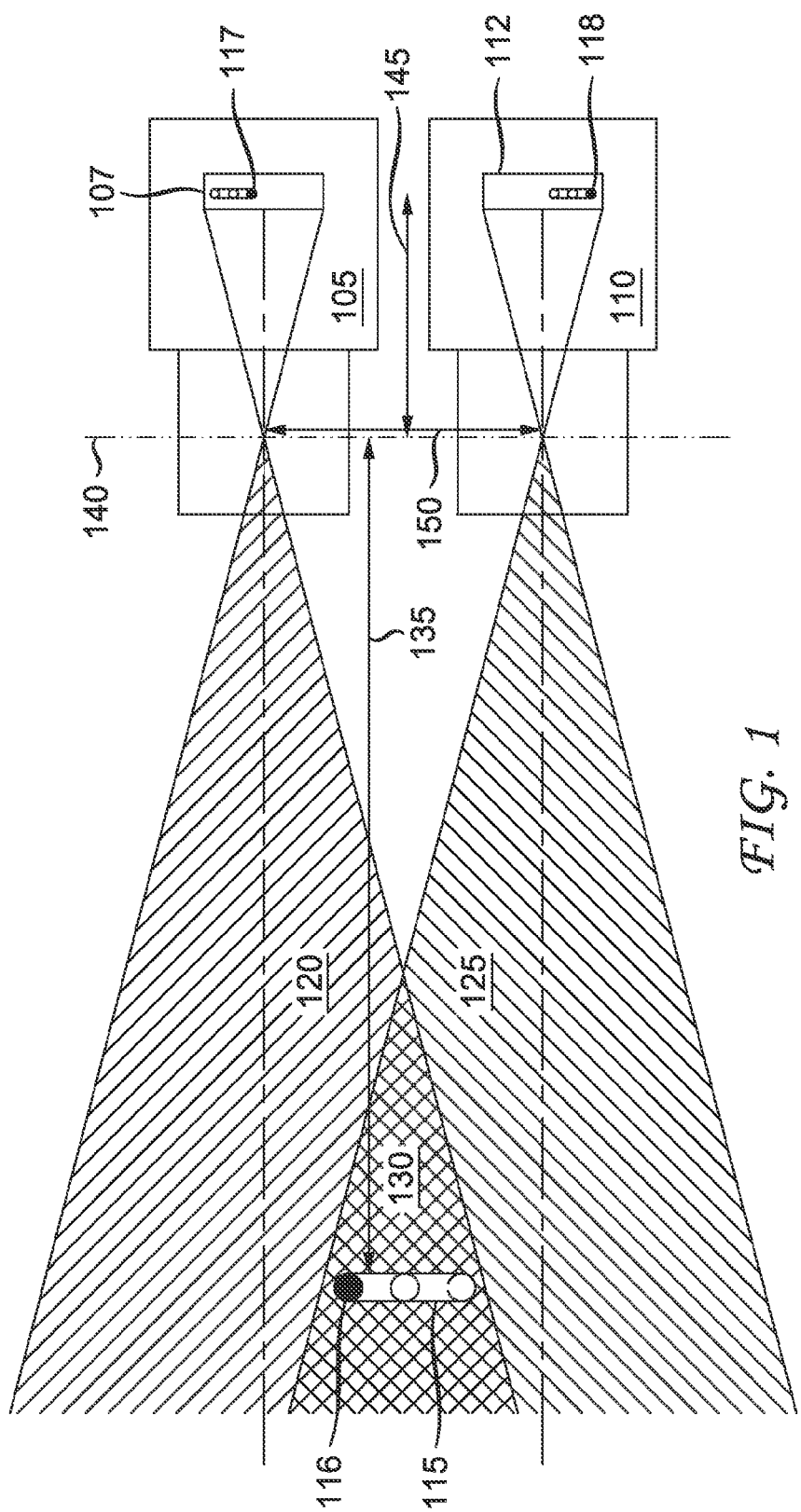
FIG. 1 is a pictorial representation of an actual depth value for parallel cameras.

Stepping back from the above preview, FIG. 1 illustrates the concept of depth in a video image. FIG. 1 shows a right camera 105 with a sensor 107, and a left camera 110 with a sensor 112. Both cameras 105, 110 are capturing images of an object 115. For the purposes of illustration, object 115 is a physical cross, having an arbitrary detail 116 located on the right side of the cross (see FIG. 2). The right camera 105 has a capture angle 120, and the left camera 110 has a capture angle 125. The two capture angles 120, 125 overlap in a 3D stereo area 130.

Because the object 115 is in the 3D stereo area 130, the object 115 is visible to both cameras 105, 110, and therefore the object 115 is capable of being perceived as having a depth. The object 115 has an actual depth 135. The actual depth 135 is generally referred to as the distance from the object 115 to the cameras 105, 110. More specifically, the actual depth 135 may be referred to as the distance from the object 115 to a stereo camera baseline 140, which is the plane defined by the entrance pupil plane of both cameras 105, 110. The entrance pupil plane of a camera is typically inside a zoom lens and, therefore, is not typically physically accessible.

The cameras 105, 110 are also shown having a focal length 145. The focal length 145 is the distance from the exit pupil plane to the sensors 107, 112. For the purposes of illustration, the entrance pupil plane and the exit pupil plane are shown as coincident, when in most instances they are slightly separated. Additionally, the cameras 105, 110 are shown as having a baseline length 150. The baseline length 150 is the distance between the centers of the entrance pupils of the cameras 105, 110, and therefore is measured at the stereo camera baseline 140.

The object 115 is imaged by each of the cameras 105 and 110 as real images on each of the sensors 107 and 112. These real images include a real image 117 of the detail 116 on the sensor 107, and a real image 118 of the detail 116 on the sensor 112. As shown in FIG. 1, the real images are flipped, as is known in the art.

Figure 2:
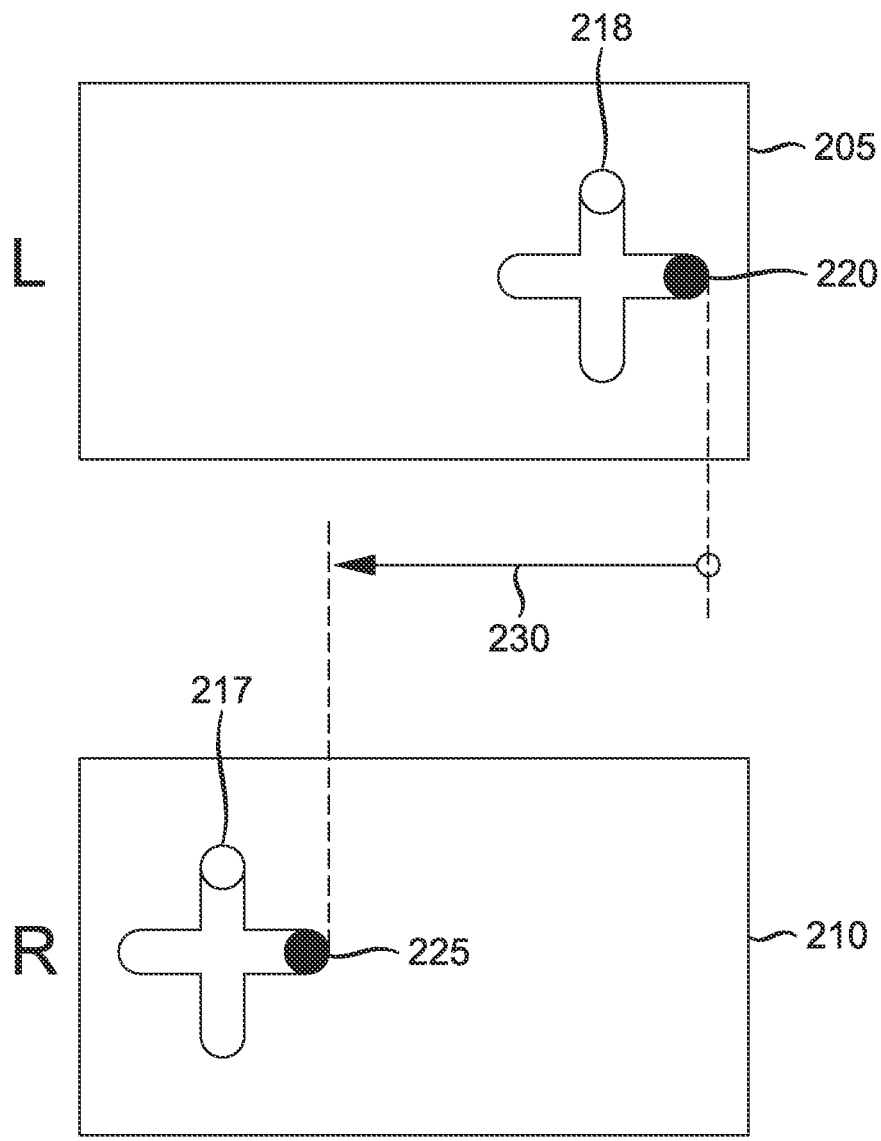
FIG. 2 is a pictorial representation of a disparity value.

Depth is closely related to disparity. FIG. 2 shows a left image 205 captured from the camera 110, and a right image 210 captured from the camera 105. Both images 205, 210 include representation of the object 115 with detail 116. The image 210 includes a detail image 217 of the detail 116, and the image 205 includes a detail image 218 of the detail 116.

The far right point of the detail 116 is captured in a pixel 220 in the detail image 218 in the left image 205. and is captured in a pixel 225 in the detail image 217 in the right image 210. The horizontal difference between the locations of the pixel 220 and the pixel 225 is the disparity 230. The object images 217, 218 are assumed to be registered vertically so that the images of detail 116 have the same vertical positioning in both the images 205, 210. The disparity 230 provides a perception of depth to the object 215 when the left and right images 205, 210 are viewed by the left and right eyes, respectively, of a viewer.

Figure 3:
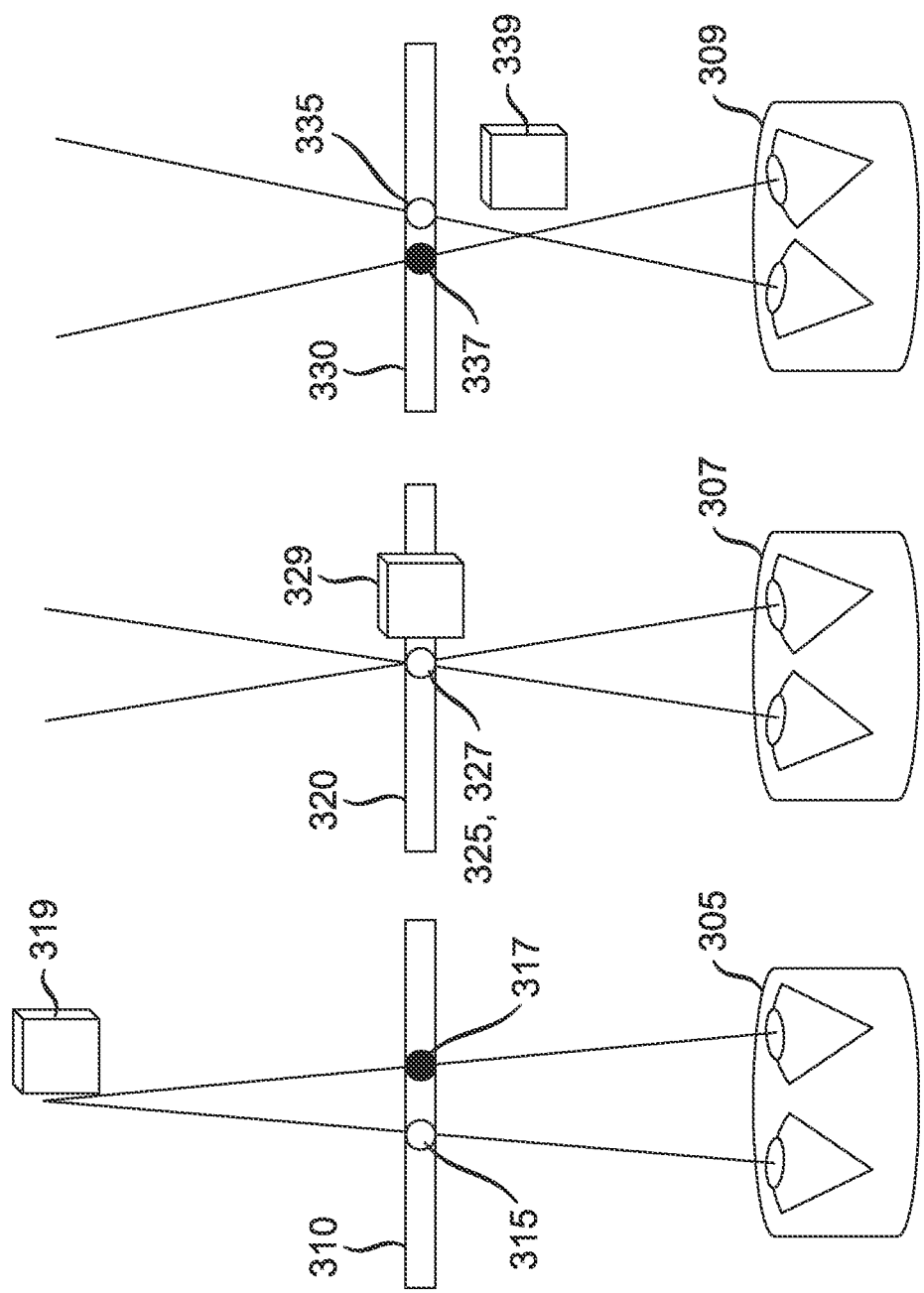
FIG. 3 is a pictorial representation of the relationship between apparent depth and disparity.

FIG. 3 shows the relationship between disparity and perceived depth. Three observers 305, 307, 309 are shown viewing a stereoscopic image pair for an object on a respective screens 310, 320, 330.

The first observer 305 views a left view 315 of the object and a right view 317 of the object that have a positive disparity. The positive disparity reflects the fact that the left view 315 of the object is to the left of the right view 317 of the object on the screen 310. The positive disparity results in a perceived, or virtual, object 319 appearing to be behind the plane of the screen 310.

The second observer 307 views a left view 325 of the object and a right view 327 of the object that have zero disparity. The zero disparity reflects the fact that the left view 325 of the object is at the same horizontal position as the right view 327 of the object on the screen 320. The zero disparity results in a perceived, or virtual, object 329 appearing to be at the same depth as the screen 320.

The third observer 309 views a left view 335 of the object and a right view 337 of the object that have a negative disparity. The negative disparity reflects the fact that the left view 335 of the object is to the right of the right view 337 of the object on the screen 330. The negative disparity results in a perceived, or virtual, object 339 appearing to be in front of the plane of the screen 330.

It is worth noting at this point, that disparity and depth can be used interchangeably in implementations unless otherwise indicated or required by context. Using Equation 1, we know disparity is inversely-proportional to scene depth.

$$D = \frac{f \cdot b}{d} \quad (1)$$

where "D" describes depth (135 in FIG. 1), "b" is the baseline length (150 in FIG. 1) between two stereo-image cameras, "f" is the focal length for each camera (145 in FIG. 1), and "d" is the disparity for two corresponding feature points (230 in FIG. 2).

Equation 1 above is valid for parallel cameras with the same focal length. More complicated formulas can be defined for other scenarios but in most cases Equation 1 can be used as an approximation. Additionally, however, Equation 2 below is valid for at least various arrangements of converging cameras, as is known by those of ordinary skill in the art:

$$D = \frac{f \cdot b}{d_\infty - d} \quad (2)$$

$d_\infty$ is the value of disparity for an object at infinity. $d_\infty$ depends on the convergence angle and the focal length, and is expressed in meters (for example) rather than in the number of pixels. Focal length was discussed earlier with respect to FIG. 1 and the focal length 145. Convergence angle is shown in FIG. 4.

Figure 4:
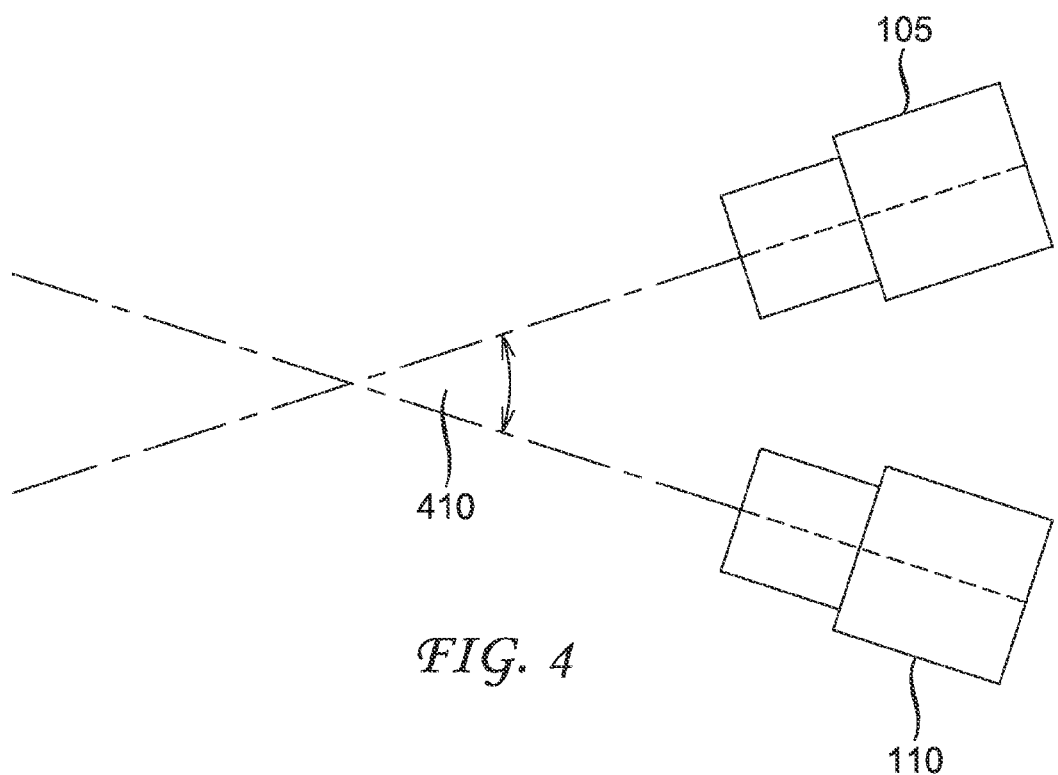
FIG. 4 is a pictorial representation of convergent cameras.

FIG. 4 includes the camera 105 and the camera 110 positioned in a converging configuration rather than the parallel configuration of FIG. 1. An angle 410 shows the lines of sight of the cameras 105, 110 converging, and the angle 410 may be referred to as the convergence angle.

Disparity maps are used to provide disparity information for a video image. A disparity map generally refers to a set of disparity values with a geometry corresponding to the pixels in the associated video image.

A dense disparity map generally refers to a disparity map with a spatial and a temporal resolution that are typically identical to the resolution of the associated video image. The temporal resolution refers, for example, to frame rate, and may be, for example, either 50 Hz or 60 Hz. A dense disparity map will, therefore, generally have one disparity sample per pixel location. The geometry of a dense disparity map will typically be the same as that of the corresponding video image, for example, a rectangle having a horizontal and vertical size, in pixels of:
  (i) 1920×1080 (or 1920×1200),
  (ii) 1440×1080 (or 1440×900),
  (iii) 1280×720 (or 1280×1024, 1280×960, 1280×900, 1280×800),
  (iv) 960×640 (or 960×600, 960×576, 960×540),
  (v) 2048×1536 (or 2048×1152),
  (vi) 4096×3072 (or 4096×3112, 4096×2304, 4096×2400, 4096×2160, 4096×768), or
  (vii) 8192×4302 (or 8192×8192, 8192×4096, 7680×4320).

It is possible that the resolution of a dense disparity map is substantially the same as, but different from, the resolution of the associated image. In one implementation, the disparity information at the image boundaries are difficult to obtain. Therefore, in that implementation, the disparity values at the boundary pixels are not included in the disparity map, and the disparity map is smaller than the associated image.

A down-sampled disparity map generally refers to a disparity map with a resolution smaller than the native video resolution (for example, divided by a factor of four). A down-sampled disparity map will, for example, have one disparity value per block of pixels. Blocks need not be an integer number of pixels in either direction. In one implementation, a down-sampled disparity map provides a disparity value for blocks that are 2.5 pixels in the horizontal direction and 2.5 pixels in the vertical direction.

A sparse disparity map generally refers to a non-dense disparity map. Sparse disparity maps, therefore, include down-sampled disparity maps. In many applications, a sparse disparity map includes a set of disparities corresponding with a limited number of pixels (for example 1000) corresponding to image feature points that are considered to be easily traceable in the corresponding video image. The limited number of pixels that are selected will generally depend on the content itself. There are frequently upwards of one or two million pixels in an image (1280×720, or 1920×1080). The pixel subset choice is generally automatically or semi-automatically done by a tracker tool able to detect feature points. Tracker tools are readily available. Feature points may be, for example, edge or corner points in a picture that can easily be tracked in other images. Features that represent high contrast edges of an object are generally preferred for the pixel subset.

Disparity maps, or more generally, disparity information, may be used for a variety of processing operations. Such operations include, for example, view interpolation (rendering) for adjusting the 3D effect on a consumer device, providing intelligent subtitle placement, visual effects, and graphics insertion.

In one particular implementation, graphics are inserted into a background of an image. In this implementation, a 3D presentation includes a stereoscopic video interview between a sportscaster and a football player, both of whom are in the foreground. The background includes a view of a stadium. In this example, a disparity map is used to select pixels from the stereoscopic video interview when the corresponding disparity values are less than (that is, nearer than) a predetermined value. In contrast, pixels are selected from a graphic if the disparity values are greater than (that is, farther than) the predetermined value. This allows, for example, a director to show the interview participants in front of a graphic image, rather than in front of the actual stadium background. In other variations, the background is substituted with another environment, such as, for example, the playfield during a replay of the player's most recent scoring play.

In one implementation, the 3D effect is softened (reduced) based on a user preference. To reduce the 3D effect (reduce the absolute value of the disparity), a new view is interpolated using the disparity and video images. For example, the new view is positioned at a location between the existing left view and right view, and the new view replaces one of the left view and the right view. Thus, the new stereoscopic image pair has a smaller baseline length and will have a reduced disparity, and therefore a reduced 3D effect.

In another implementation, extrapolation, rather than interpolation, is performed to exaggerate the apparent depth and thereby increase the 3D effect. In this implementation, a new view is extrapolated corresponding to a virtual camera having an increased baseline length relative to one of the original left and right views.

In another example, disparity maps are used to intelligently position subtitles in a video image so as to reduce or avoid viewer discomfort. For example, a subtitle should generally have a perceived depth that is in front of any object that the subtitle is occluding. However, the perceived depth should generally have a depth that is comparable to the region of interest, and not too far in front of the objects that are in the region of interest.

For many 3D processing operations, a dense disparity map is preferred over a down-sampled disparity map or other sparse disparity maps. For example, when a disparity map is used to enable user-controllable 3D-effects, disparity information on a per-pixel basis is generally preferred. The per-pixel basis disparity information generally allows better results to be achieved, because using a sparse disparity map (for example, a down-sampled disparity map) may degrade the quality of synthesized views.

A disparity value may be represented in a variety of formats. Several implementations use the following format to represent a disparity value for storage or transmission:
  (i) Signed integer: 2s complement
    (a) Negative disparity values indicate depth that is in front of the screen.
    (b) Zero is used for disparity value for objects in the screen plane.
  (ii) Units of ⅛ pixel
  (iii) 16 bits to represent the disparity value
    (a) A typical disparity range varies between +80 and −150 pixels. This is generally sufficient on a forty inch display having a resolution of 1920 or 2048.

(b) With ⅛ pixel accuracy, the range is between +640 and −1200 units, which can be represented by 11 bits+1 bit for the sign=12 bits (c) To keep the same 3D effect on an 8 k display (which would have approximately four times the horizontal resolution of a display that is 1920 or 2048 pixels wide), we typically need two additional bits to code the disparity: 12+2=14 bits (d) This provides 2 bits for future use Further, various implementations that use the above format also provide for a dense disparity map. Thus, to complete a dense disparity map for such implementations, the above 16-bit format is provided for every pixel location in a corresponding video image.

Figure 5:
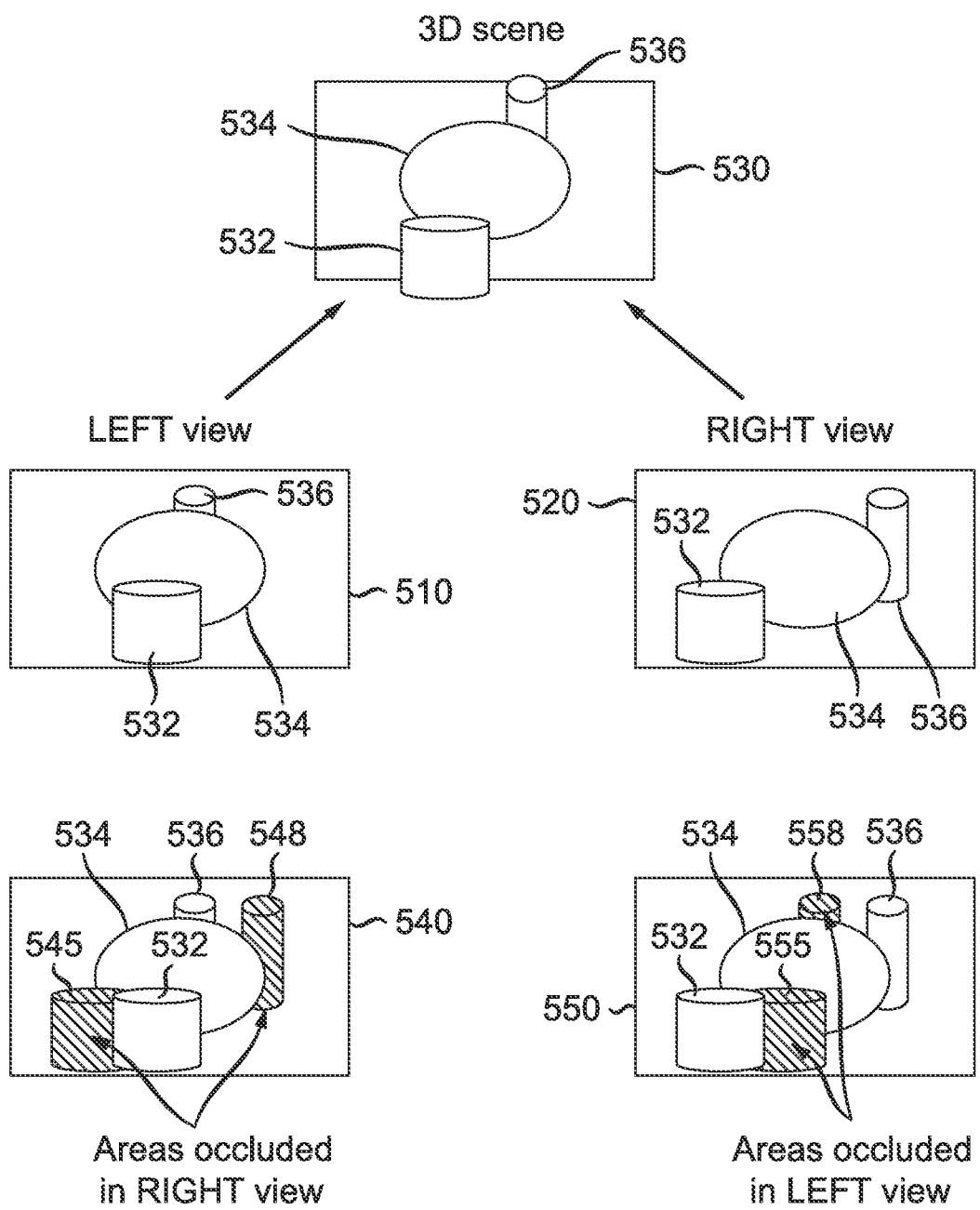
FIG. 5 is a pictorial representation of occlusion in stereoscopic video image pairs.

Disparity, and the related depth variations, produce occlusions between different views of a scene. FIG. 5 shows a left view 510 and a right view 520 that combine, in a viewer's brain, to produce a 3D scene 530. The left view 510, the right view 520, and the 3D scene 530 each contain three objects, which include a wide cylinder 532, an oval 534, and a thin cylinder 536. However, as shown in FIG. 5, two of the three objects 532, 534, 536 are in different relative locations in each of the views 510, 520 and the 3D scene 530. Those two objects are the wide cylinder 532 and the thin cylinder 536. The oval 534 is in the same relative location in each of the views 510, 520 and the 3D scene 530.

The different relative locations produce occlusions, as explained by the following simplified discussion. The left view 510 is shown in a left image 540 that also reveals occluded areas 545 and 548. The occluded areas 545 and 548 are only visible in the left view 510 and not in the right view 520. This is because (i) the area in the right view 520 that corresponds to the occluded area 545 is covered by the wide cylinder 532, and (ii) the area in right view 520 that corresponds to the occluded area 548 is covered by the narrow cylinder 536.

Similarly, the right view 520 is shown in a right image 550 that also reveals two occluded areas 555 and 558. The occluded areas 555, 558 are only visible in the right view 520 and not in the left view 510. This is because (i) the area in the left view 510 that corresponds to the occluded area 555 is covered by the wide cylinder 532, and (ii) the area in the left view 510 that corresponds to the occluded area 558 is covered by narrow cylinder 536.

Given that occlusions may exist in a stereoscopic image pair, it is useful to provide two disparity maps for a stereoscopic image pair. In one such implementation, a left disparity map is provided for a left video image, and a right disparity map is provided for a right video image. Known algorithms may be used to assign disparity values to pixel locations of each image for which disparity values cannot be determined using the standard disparity vector approach. Occlusion areas can then determined by comparing the left and right disparity values.

As an example of comparing left and right disparity values, consider a left-eye image and a corresponding right-eye image. A pixel L is located in row N and has a horizontal coordinate $x_L$ in the left-eye image. Pixel L is determined to have a disparity value $d_L$. A pixel R is located in row N of the corresponding right-eye image and has a horizontal coordinate nearest $x_L+d_L$. The pixel R is determined to have a disparity value $d_R$ of about "$-d_L$". Then, with a high degree of confidence, there is no occlusion at L or R because the disparities correspond to each other. That is, the pixels L and R both point to each other, generally, with their determined disparities.

However, if $d_R$ is not substantially the same as $-d_L$, then there may be an occlusion. For example, if the two disparity values are substantially different, after accounting for the sign, then there is generally a high degree of confidence that there is an occlusion. Substantial difference is indicated, in one implementation, by $|d_L-d_R|>1$. Additionally, if one of the disparity values (either $d_R$ or $d_L$) is unavailable, then there is generally a high degree of confidence that there is an occlusion. A disparity value may be unavailable because, for example, the disparity value cannot be determined. The occlusion generally relates to one of the two images. For example, the portion of the scene shown by the pixel associated with the disparity having the smaller magnitude, or shown by the pixel corresponding to the unavailable disparity value, is generally considered to be occluded in the other image.

One possibility for representing disparity values is to use an integer to represent the number of pixels of disparity for a given pixel location in a video image. The disparity value represents the number of pixels of disparity for the particular horizontal resolution of the video image. The disparity value depends, therefore, on the particular horizontal resolution. Such implementations are useful and can be effective.

Other implementations, however, require sub-pixel accuracy in disparity values. Such implementations generally use floating point numbers to represent disparity values so that fractions can be included in the disparity values. Several of these implementations provide disparity values that are specific to a given horizontal resolution. These implementations are also useful and can be effective.

Some other implementations represent disparity values as a percentage value. Therefore, instead of representing the disparity as a number of pixels, the disparity is represented as a percentage of the horizontal resolution. For example, if the disparity for a given pixel location is ten pixels, and the horizontal resolution is 1920, then the percentage disparity value is (10/1920)*100. Such implementations can also provide sub-pixel accuracy in disparity. A percentage value representation is typically a floating point representation, rather than an integer representation. For example, one pixel of disparity in a display having a horizontal resolution of 1920 is 1/1920, which is 0.0005208 or 0.05208%.

Further, such percentage disparity values can be applied directly to other horizontal resolutions. For example, assume that (i) a video image has a horizontal resolution of 1920, (ii) the video image is transmitted to a user's home, and (iii) the user's display device has a horizontal resolution of 1440. In this scenario, the user's display device (or set-top box, or router, or some other processor or processing device) typically converts the video image's horizontal resolution from 1920 to 1440, and also converts the disparity values so that the disparity values correspond to a horizontal resolution of 1440. The conversion may be performed, for example, by multiplying the percentage disparity value by the horizontal resolution. For example, if the percentage disparity for a given pixel location is ½%, and the horizontal resolution is 1920, then the absolute disparity value is ½*1920/100. Several of these implementations use a single disparity value, which is a percentage disparity value, in the transmission and storage of disparity values, regardless of the horizontal resolution of the video image and the disparity map. Such implementations are also useful, and can be effective.

As mentioned above, a transmission system may use a horizontal resolution in the transmission format that is different from the horizontal resolution of the video image. Additionally, a receiving system may use a different horizontal resolution to display the video image. Thus, a conversion from one horizontal resolution to another horizontal resolution may be required. Such a conversion not only changes the resolution of the video image, but also requires that the disparity values be adjusted. Such a conversion would generally be required for absolute disparity values, but not for percentage disparity values.

The following example provides more details about some of the trade-offs between various implementations:

(i) One implementation formats the disparity value as an absolute value (number of pixels) for a given video resolution with a precision of $\frac{1}{8}^{th}$ of a pixel (for example, an object could have 10 pixels of disparity on a video content having 1920 horizontal pixels).

(ii) There are many advantages of such a system, including simplicity and ease of manipulation.

(iii) In one such system, 11 bits are used: 8 bits for the integer part to provide up to 255 pixels of disparity, and 3 bits for the decimal part (to get the $\frac{1}{8}^{th}$ precision or accuracy). Note that a sign bit would be used as well, or the system could provide disparity values of +/−127 pixels.

(iv) If the video image needs to be reformatted during transmission, the disparity map is reformatted as well, possibly leading to information loss. For example, referring to FIG. 6, an implementation uses a native format 610 that has a horizontal resolution of 1920 and a transmission format 620 that is down sampled to have a horizontal resolution of 1280 (or 1440 in another implementation). The depth or disparity map, as with the video image, is filtered before sub-sampling which typically leads to a loss of depth details. The filtering occurs in a filtering and sub-sampling operation 630. The filtering and sub-sampling operation is applied to the video images and the disparity images.

(v) Furthermore, the new disparity value is converted, and typically corrupted. For example, after down sampling to reduce the resolution of the disparity map (that is, to reduce the number of disparity values), the disparity values are converted to the resolution of the transmission format. The disparity value of 10 pixels becomes 6.6666 when passing from 1920 to 1280. This results, for example, in rounding off the value to 6.625 since the decimal part can only be a multiple of 0.125 ($\frac{1}{8}$).

(vi) After transmission, if the display is 1920 pixels wide, the final disparity value will be 6.625×1920/1280=9.9375. The value of 9.9375 represents some distortion as compared to the original value of 10. The value of 9.9375 may be rounded up, down, or to the nearest integer, or the nearest $\frac{1}{8}$th, for example, possibly creating information loss. The loss would be significant if the value were rounded down.

One solution is to use a percentage disparity that may be common to all horizontal resolutions. Such an implementation, described above, has advantages and drawbacks. The use of percentage disparity values allows the conversion operation prior to transmission to be omitted.

Another solution is to use an integer value that is not specific to any one common resolution. (Note that pictures are typically assumed to have been rectified vertically as well as receiving other processing. Accordingly, it is typically sufficient to discuss disparity in terms of horizontal displacement.) This solution proposes to define a reference resolution (or virtual resolution) of 11,520 pixels, which is referred to in this application as the smallest common multiple ("SCM") of several standard TV horizontal resolutions (720, 960, 1280, 1440, 1920). Note that the SCM is also referred to in various references as the "lowest common multiple" or "least common multiple", both of which can be abbreviated as LCM.

At least one implementation of this SCM solution has a number of advantages, including the following (other implementations need not have all of these advantages):

(i) Because the disparity value is an integer, determining and storing the disparity value is simple, and the disparity value is easy to manipulate and process.

(ii) The disparity value is no longer strictly absolute but has a relative aspect, and therefore is independent of the native video resolution.

(iii) A decimal part is not required.

(iv) The disparity value is like a percentage because it is relative, and independent of the native video resolution. However, the disparity value is an integer, so there is no apparent need to code complicated numbers like 0.00868% to describe the minimum disparity value. The minimum disparity value is one pixel, and 1/11,520 is 0.00868%.

(v) There is no apparent need to transcode the disparity value during transport because the disparity value refers to 11,520.

(vi) When the SCM-based disparity values arrive at, for example, the set-top box ("STB"), the STB calculates the real absolute disparity for a given video resolution by performing a very simple operation, such as, for example:

(a) Disparity/6 for 1920 resolution
(b) Disparity/8 for 1440 resolution
(c) Disparity/9 for 1280 resolution
(d) Disparity/12 for 960 resolution (vii) The disparity information is not degraded during the transport, as long as there is no transcoding, regardless of which channels are used.

(viii) Even for newer consumer resolutions like 2 k, 4 k, 8 k, the operation is simple to implement, and it is easily implementable in a STB processing unit. Note that 2 k generally refers to images having a horizontal pixel resolution of 2048, 4 k generally refers to 4096, and 8 k generally refers to 8192. The operations are, for example:

(a) Disparity×8/45 for 2048 resolution
(b) Disparity×16/45 for 4096 resolution
(c) Disparity×32/45 for 8192 resolution In practice, one or more SCM implementations (1) determine the disparity values for the existing horizontal resolution of the corresponding video content, (2) convert those disparity values to the scale of 11,520 with a simple multiplication and/or division to create an SCM disparity value, (3) store and transmit the SCM disparity values without transcoding, and (4) convert the received SCM disparity values to the resolution of the output display using a simple multiplication and/or division. Because there is no transcoding, this solution would generally not suffer from loss of information (for example, rounding losses) due to transcoding. Note that the resolution of the disparity map is not changed by the above process. Rather, the existing disparity values (for the existing resolution) are scaled so that they are based on, or reflect, a reference resolution (or virtual resolution) that is different from the actual resolution.

Figures 6, 7:
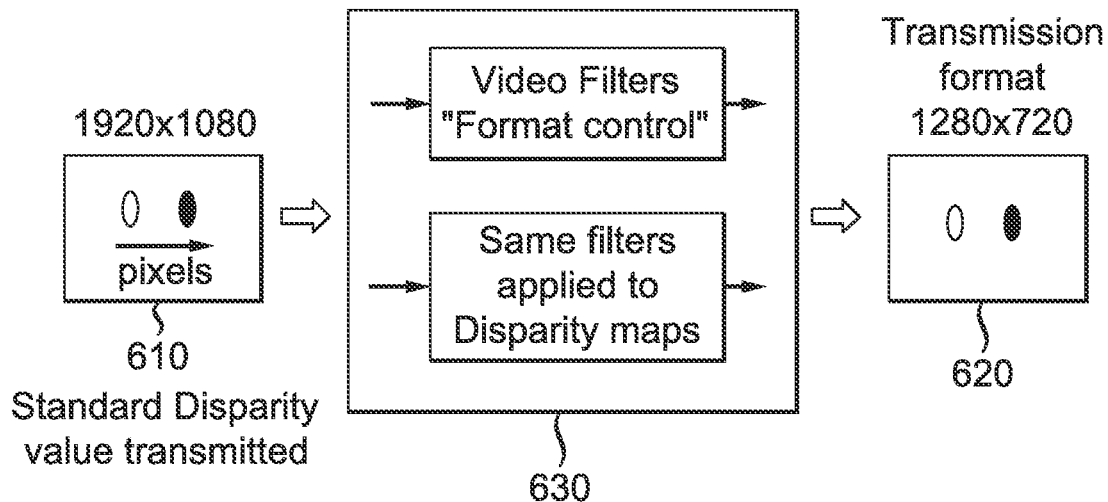
FIG. 6 is a block/flow diagram depicting an implementation having a different native format and transmission format.
FIG. 7 is a tabular representation of an example of a common multiple representation of disparity values.

Various implementations create disparity values by performing a simple mathematical operation that is the inverse of those described above. For example, to create an SCM disparity value, the received absolute disparity value is multiplied and/or divided by one or two integers as follows:

(i) 1920 disparity*6=SCM disparity (ii) 1440 disparity*8=SCM disparity
(iii) 1280 disparity*9=SCM disparity
(iv) 960 disparity*12=SCM disparity
(v) 2048 disparity*45/8=SCM disparity
(vi) 4096 disparity*45/16=SCM disparity
(vii) 8192 disparity*45/32=SCM disparity FIG. 7 provides more detail into the process of determining a smallest common multiple for various different horizontal resolutions. A column 710 lists the different horizontal resolutions. A column 720 lists the smallest factors of the horizontal resolutions. For example, 960 is factored into $2^6*3*5$, where $2^6$ is 2 raised to the $6^{th}$ power. Thus, 960=64*3*5. It is also noted, with respect to the horizontal resolution of 1280, that $3^0$ is equal to one.

The smallest common multiple of the first four resolutions of 960, 1280, 1440, and 1920, is $2^8*3^2*5$, which is 11,520. The 11,520 resolution is used with resolutions of 2 k, 4 k, and 8 k, by multiplying by an appropriate power of 2, and then dividing by the factors $3^2$ and 5 which are not present in 2 k, 4 k, and 8 k. Note that multiplying by a power of 2 is performed, in various implementations, using a bitwise left-shift operation, rather than an actual multiplication operation. FIG. 7 includes a column 730 that provides the conversion equation to convert between 11,520 and the various resolutions shown in the column 610.

The conversion equations of the column 630 can be used to scale disparity values based on resolutions supported by multiple common display sizes (the display size referring to the physical size of the display, measured, for example, in inches or centimeters). In the example of FIG. 6, input disparity values that are based on, for example, a horizontal resolution of 1920 are scaled by a factor of six to convert the disparity value into a new disparity value that is based on a horizontal resolution of 11,520. The new disparity value is also based on the horizontal resolutions of 960, 1280, and 1440 because those resolutions are accommodated by, and are used in determining, the resolution of 11,520.

An alternate implementation simply uses a disparity resolution of $11,520*2^5=368,640$. In this alternate implementation, no multiplication is needed to convert the 368,640 back to the original resolution.

The value of 11,520 is used for various implementations. However, other values are used in other implementations. In one implementation, the 11,520 value is doubled to 23,040. In a second implementation, the 368,640 value is doubled to 737,280.

Alternatively, a different set of horizontal resolutions is used in various implementations, resulting in a different SCM. For example, in another implementation only 1920 and 1440 output resolutions are of interest, and therefore the implementation uses an SCM of 5,760. Then, to generate the SCM disparity values, disparity values from the 1920 resolution are multiplied by a factor of 3, and disparity values from the 1440 resolution are multiplied by a factor of 4.

It should be clear that various implementations are not SCM implementations. For example, even the 11,520 value is not the SCM of all seven resolutions listed in the column 710. Rather, the 368,640 value is the SCM. Nonetheless, the implementations described in this application are generally referred to as SCM implementations even if the disparity value is not the smallest common multiple of all of the horizontal resolutions.

Note that the SCM implementations provide sub-pixel accuracy. For example, for a 1920 resolution, the disparity values use a factor of 6 to convert to/from the 11,520 resolution, which provides $\frac{1}{6}^{th}$ pixel accuracy. More specifically, if the 11,520-based disparity value is 83, then the 1920-based disparity value is 13 5/6. This obviously provides $\frac{1}{6}^{th}$ pixel accuracy. This provides various advantages in terms of quality, as well as margin for future needs. For example, if the 1920 resolution is replaced by the 2 k resolution, the 11,520-based disparity values still provide a sub-pixel accuracy of $\frac{8}{45}^{th}$ pixel accuracy, which is slightly less accurate than $\frac{1}{6}^{th}$ (7.5/45) pixel, but still more accurate than $\frac{1}{5}^{th}$ (9/45) pixel.

At least one implementation that uses the SCM resolution of 11,520 operates with a two byte (sixteen bit) format. A typical disparity range often varies between +80 and −150 pixels on a 1920×1080 display (resolution). Multiplying those numbers by six, produces a range of +480 to −900 on the 11,520 reference resolution. This range of 1380 can be represented by eleven bits ($2^{11}$=2048). An alternate implementation uses ten bits to represent the absolute value of the disparity (disparity maximum absolute value is 900), and an additional bit to represent the sign.

Yet another implementation conserves a bit by considering the sign of the disparity to be implicit. For example, the disparity of pixels in a left view is coded, along with the sign of the disparity. However, the disparity of corresponding pixels in a corresponding right view are assumed to have the opposite sign.

Another implementation, in order to be able to provide one dense disparity map per view (both left view and right view), and thereby to reduce issues caused by occlusions, allocates a bit to indicate the view to which the dense disparity map corresponds. Another implementation provides an implicit association between an image (either a left image or a right image) and a corresponding dense disparity map, and therefore does not need to devote a bit to this information. Variations on these implementations use one or more additional bits to introduce other types of maps or images. One such implementation uses two bits to indicate whether the map is (i) a left image disparity map, (ii) a right image disparity map, (iii) an occlusion map, or (iv) a transparency map. One implementation has a sixteen bit format, and uses 11 bits to indicate a range of −900 to +480, two bits to indicate the type of map, and has three bits unused.

Figure 8:
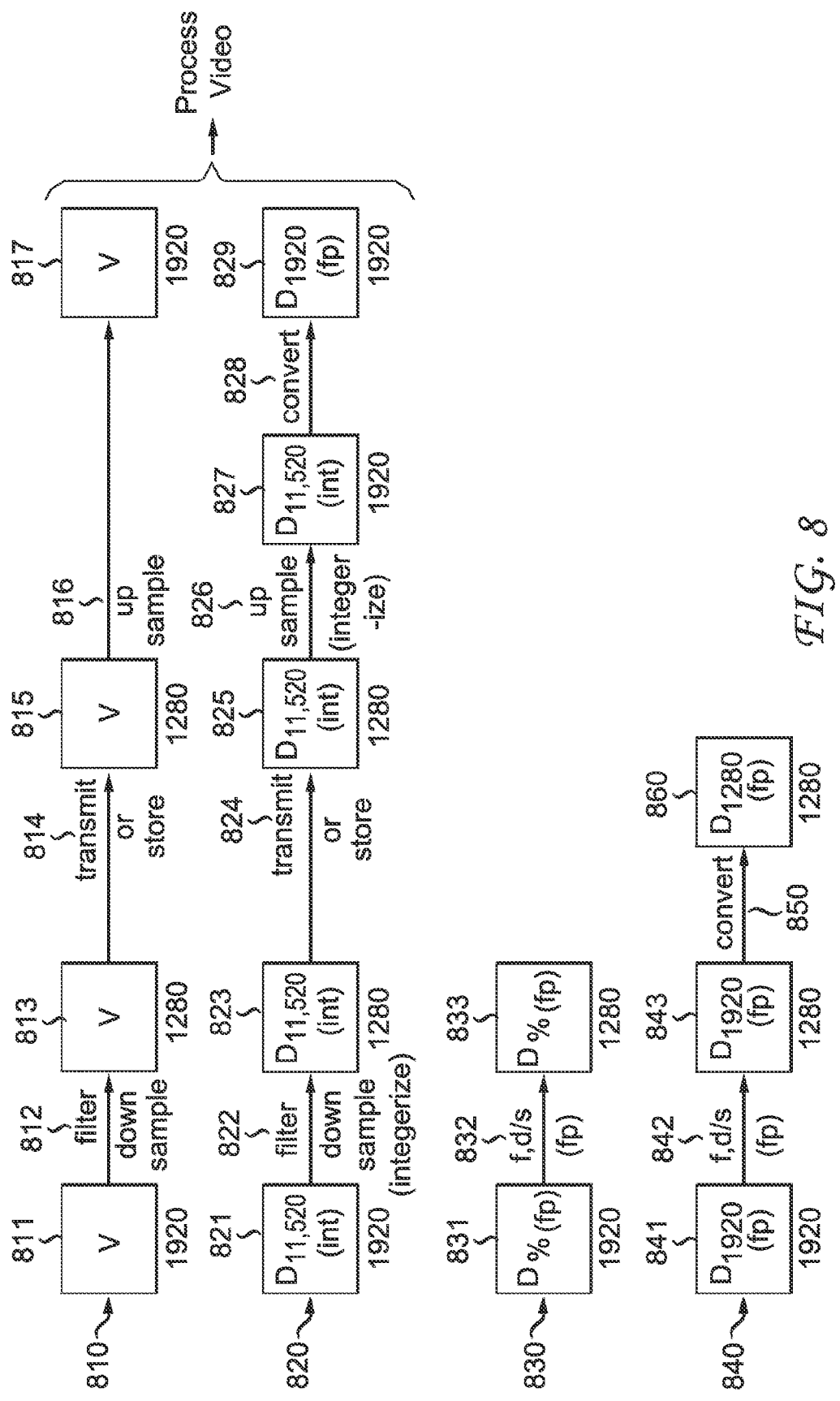
FIG. 8 is a block/flow diagram depicting an example of a process for transmission and use of a common multiple representation of disparity values.

FIG. 8 provides a block/flow diagram that illustrates the operation of one or more implementations. FIG. 8 also illustrates some of the trade-offs between different implementations.

FIG. 8 includes a processing chain 810 that processes video. A video image 811 has a horizontal resolution of 1920. However, the transmission format of the processing chain 810 has a horizontal resolution of 1280. Accordingly, the video image 811 is filtered and down-sampled in an operation 812 to produce a video image 813 having a horizontal resolution of 1280. The filtering and down-sampling are performed together in the processing chain 810. Other implementations perform the filtering and down-sampling separately, however. The filtering is used, for example, to low-pass filter the video image 811 with the goal of preventing aliasing when the video image 811 is down-sampled. The video image 813 is conveyed in a transmission and/or storage operation 814.

A receiving side of the chain 810 accesses a received video image 815, which can be the same as, similar to, or different from, the video image 813. For example, in one implementation, the video image 815 is a stored version of the video image 813. Additionally, in another implementation, the video image 815 represents a reconstructed version of the video image 813 after source encoding and decoding operations (not shown). Further, in yet another implementation, the video image 815 represents an error-corrected version of the video image 813 after channel encoding and decoding (including error correction) operations (not shown). The video image 815 is processed in an upsampling operation 816 to produce a video image 817 having the 1920 horizontal resolution, as in the original video image 811.

FIG. 8 also includes a processing chain 820 that processes disparity images corresponding to the video images processed in the chain 810. A disparity image 821 has a horizontal resolution of 1920, and includes integer-valued disparity values based on a resolution of 11,520. Note that a disparity image refers generally to any accumulation of disparity information, such as, for example, a dense disparity map, a down-sampled (sparse) disparity map, or another sparse disparity map. Further, the disparity map may correspond, for example, to a picture, a frame, a field, a slice, a macroblock, a partition, or some other collection of disparity information.

However, the transmission format of the processing chain 820 has a horizontal resolution of 1280. Accordingly, the disparity image 821 is filtered and down-sampled in an operation 822 to produce a disparity image 823 having a horizontal resolution of 1280. The filtering and down-sampling are performed together in the processing chain 820. Other implementations perform the filtering and down-sampling separately, however. The filtering is used, for example, to low-pass filter the disparity values of the disparity image 821 with the goal of preventing aliasing when the disparity image 821 is down-sampled.

The disparity values of the disparity image 823 are integer values. This may be accomplished in various ways. In one implementation, the result of the filtering and down-sampling operations is rounded to the nearest integer. In another implementation, any fractional portion is simply discarded. Yet another implementation uses a floating point representation for the disparity values of the disparity image 823. Note that the disparity values are still based on a resolution of 11,520 even after the filtering and down-sampling produces a resolution for the disparity image 823 of 1280.

The disparity image 823 is conveyed in a transmission and/or storage operation 824. A receiving side of the chain 820 accesses a received disparity image 825. The disparity image 825 can be the same as, similar to, or different from, the disparity image 823. For example, in one implementation, the disparity image 825 is a stored version of the disparity image 823. Additionally, in another implementation, the disparity image 825 represents a reconstructed version of the disparity image 823 after source encoding and decoding operations (not shown). Further, in yet another implementation, the disparity image 825 represents an error-corrected version of the disparity image 823 after channel encoding and decoding (including error correction) operations (not shown). The disparity values in the disparity image 825 remain as integers, however, by, for example, using rounding if needed.

The disparity image 825 is processed in an upsampling operation 826 to produce a disparity image 827 having the 1920 horizontal resolution, as in the original disparity image 821. The operation 826 produces integer values for the disparity image 827, using, for example, rounding or truncation.

The disparity values of the disparity image 827 are converted, in a conversion operation 828, from being based on a resolution of 11,520 to being based on a resolution of 1920. The conversion operation 828 divides each disparity value by six, as explained above. The conversion operation 828 produces a disparity image 829. The disparity values of the disparity image 829 are represented as floating point numbers in order to preserve sub-pixel accuracy.

It should be clear that the processing chain 820 includes significant advantages. First, the disparity values are integers throughout the chain 820 until the final disparity image 829 is provided. Second, the actual disparity values are not transcoded, despite the fact that the transmission format's horizontal resolution is different from the horizontal resolution of the native disparity map 821. Thus, the disparity values are applicable to a variety of different horizontal resolutions.

A receiving system then processes the video image 817, using the disparity image 829. The processing may include, as explained earlier, adjusting 3D effects, positioning subtitles, inserting graphics, or performing visual effects.

FIG. 8 also depicts a processing chain 830 for comparison purposes. The processing chain 830 also processes disparity images corresponding to the video images processed in the chain 810. The processing chain 830 is an alternative to the processing chain 820. It should be clear that the entire chain 830 is not shown in order to simplify FIG. 8, as will be explained below.

A disparity image 831 has a horizontal resolution of 1920, and includes percentage-based disparity values having a floating point representation. However, the transmission format of the processing chain 830 has a horizontal resolution of 1280.

Accordingly, the disparity image 831 is filtered and down-sampled in an operation 832 to produce a disparity image 833 having a horizontal resolution of 1280. The operation 832 may be analogous, for example, to the filtering and down-sampling operation 812 or 822. The percentage-based disparity values of the disparity image 833 continue to be represented in a floating point format.

The rest of the processing chain 830 (not shown) mirrors that of the processing chain 820. The disparity image 833 is conveyed in a transmission and/or storage operation. A receiving side of the chain 830 accesses a received disparity image. The received disparity image is upsampled to a horizontal resolution of 1920, and then the disparity values are converted from being percentage-based to being based on a resolution of 1920. The conversion operation is a multiplication of the percentage times 1920, as explained above. In contrast to the processing chain 820, however, the disparity values of the disparity images in the processing chain 830 are always represented in floating point format.

FIG. 8 also depicts a processing chain 840 for comparison purposes. The processing chain 840 also processes disparity images corresponding to the video images processed in the chain 810. The processing chain 840 is an alternative to the processing chain 820. It should be clear that the entire chain 840 is not shown in order to simplify FIG. 8, as will be explained below.

A disparity image 841 has a horizontal resolution of 1920, and includes disparity values based on the 1920 resolution and having a floating point representation. However, the transmission format of the processing chain 840 has a horizontal resolution of 1280. Accordingly, the disparity image 841 is filtered and down-sampled in an operation 842 to produce a disparity image 843 having a horizontal resolution of 1280. The operation 842 may be analogous, for example, to the filtering and down-sampling operation 812, 822, or 823. The disparity values of the disparity image 843 continue to be represented in a floating point format.

The disparity values of the disparity image 843 are then converted, in a conversion operation 850, to produce a disparity image 860. The conversion operation 850 converts the disparity values from being based on a horizontal resolution of 1920 to being based on a horizontal resolution of 1280. The disparity values of the disparity image 860 continue to be represented in a floating point format.

The rest of the processing chain 840 (not shown) mirrors that of the processing chain 820. The disparity image 860 is conveyed in a transmission and/or storage operation. A receiving side of the chain 840 accesses a received disparity image. The received disparity image is upsampled to a horizontal resolution of 1920, and then the disparity values are converted from being based on a resolution of 1280 to being based on a resolution of 1920. The conversion operation involves multiplying the disparity values by 1920/1280. As with the processing chain 830, and in contrast to the processing chain 820, the disparity values of the disparity images in the processing chain 840 are always represented in floating point format.

In another implementation of the processing chain 840, the conversion operation 850 is not performed. Thus, the disparity values of the disparity image 843 remain as disparity values that are based on a horizontal resolution of 1920. However, the horizontal resolution of the disparity image 843 remains as 1280. Thus, this implementation avoids the conversion prior to transmission, and possibly avoids a re-conversion after reception or retrieval. Avoiding conversion and re-conversion also avoids rounding errors in at least some implementations. This implementation, as with all other implementations in this application, has advantages and can be useful. However, the disparity values are represented with floating point numbers throughout the implementation.

We refer again to an SCM implementation in which a resolution of, for example, 11,520 is used. The 11,520 width is referred to as the smallest common multiple of the width (horizontal axis) of a selection of predetermined image resolutions (for example, 960, 1280, 1440, and 1920) as described earlier. Note that 11,520 is also the smallest common multiple of 1280, 1440, and 1920.

A single count of horizontal disparity using the SCM can be termed a "disparity unit" (DU) or "horizontal unit" (HU) or "horizontal disparity unit" (HDU). Expressing disparities in terms of a DU effectively expresses disparities relative to the smallest common multiple of the selected image widths. Expressing disparity in terms of a DU has advantages. One such advantage of expressing disparities in terms of a DU is that a disparity calculated for an object in a stereo-image pair at one of the selected resolutions is substantially the same for the same object in a version of the same stereo-image pair scaled to a different one of the selected resolutions.

Figure 9:
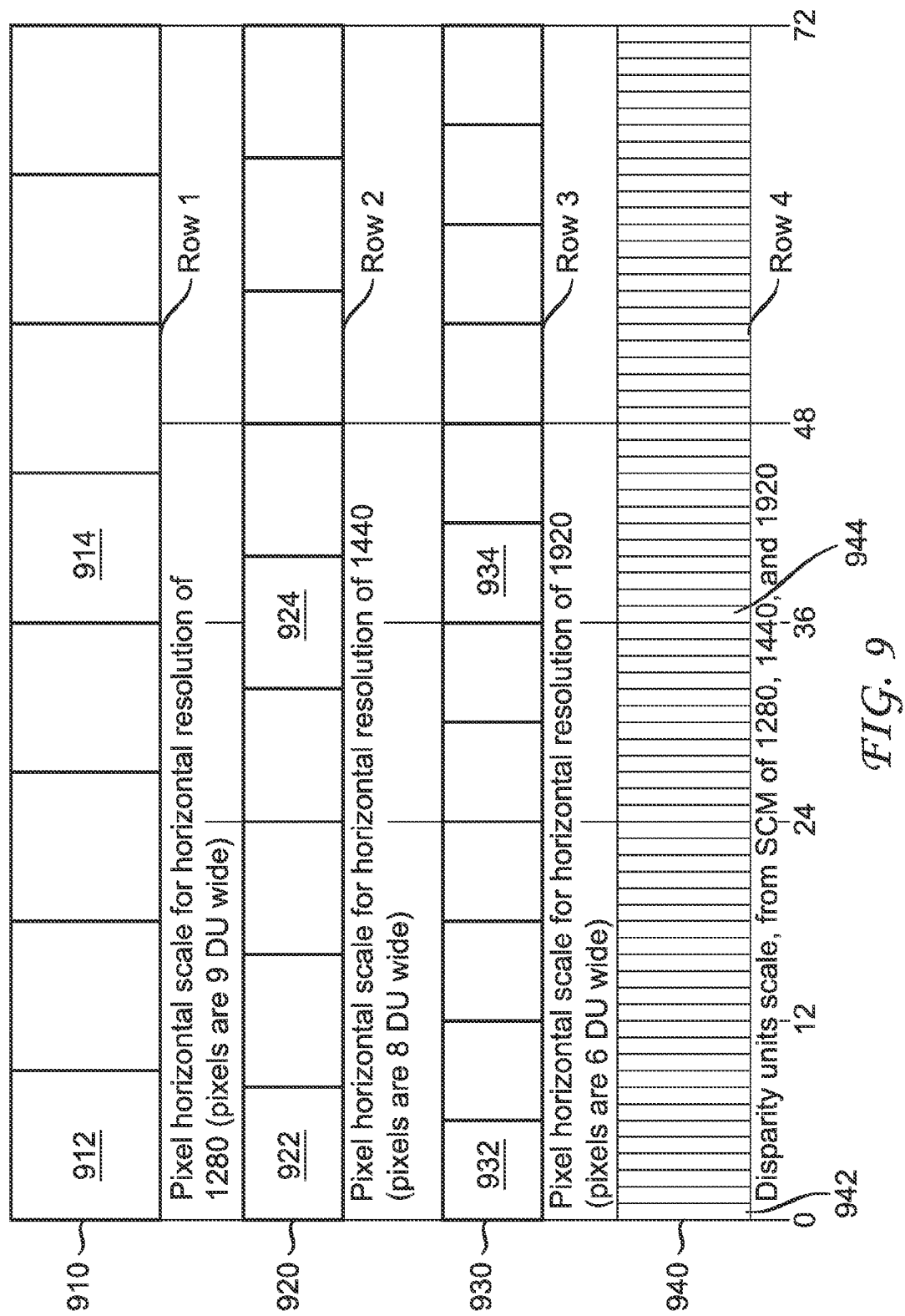
FIG. 9 is a block/pictorial representation of several examples of pixels at different resolutions.

For example, referring to FIG. 9, there are three rows 910, 920, and 930 of pixels shown, representing the same region, but in images at three different resolutions. Additionally, there is a fourth row 940 showing disparity units from a SCM resolution of 11,520.

A top row 910 includes a region of pixels from a picture that is 1280 pixels wide. The top row 910 includes eight pixels, as shown. The top row 910 is actually at a resolution of 1280×720, which typically has an image aspect ratio of 16:9 which corresponds to pixels having an aspect ratio of 1:1. Thus, the pixels in the top row 910 are shown as squares.

A second row 920 includes a region of pixels from the same picture as the row 910. However, the row 920 is drawn from the picture after the picture is resized to be 1440 pixels wide, to give an overall image having a resolution of 1440×1080, which typically has the same image aspect ratio of 16:9, however with a pixel aspect ratio of 4:3. Thus, the row 920 includes nine pixels, as shown, rather than simply eight pixels as in the row 910.

A third row 930 includes a region of pixels from the same picture as the row 910 and the row 920. However, the row 930 is drawn from the picture after the picture is resized to be 1920 pixels wide for an overall image resolution of 1920×1080. The picture has, as with the other resolutions discussed, an aspect ratio of 16:9, but has a pixel aspect ratio of 1:1 (square pixels) as with the row 910. Thus, the row 930 includes twelve pixels, as shown, rather than simply eight pixels as in the row 910 or nine pixels as in the row 920. It should be clear that the row 910, the row 920, and the row 930 all display corresponding regions of the picture, and include the same content.

We provide an example to illustrate the disparity difference in these four different resolutions. In an implementation, an object appears precisely at a leftmost pixel 912 of the top row 910 in the 1280 pixel wide version of one image of a stereo-image pair, and precisely at a fifth pixel 914 in the corresponding other-eye image of the stereo-image pair. The disparity is halfway across the top row 910, or (in pixels) exactly 4 (calculated as 5−1).

However, as measured in the rescaled image of the third row 930, the object appears in the leftmost pixel 932 of one image of a stereo-image pair, and precisely at a seventh pixel 934 in the corresponding other-eye image of the stereo-image pair. Thus, the disparity, which is halfway across the third row 930, measures 6 pixels.

Further, as measured in the rescaled image of the second row 920, the object appears in the leftmost pixel 922 of one image of a stereo-image pair. The object also appears in the right half of the fifth pixel 924 in the corresponding other-eye image of the stereo-image pair. Thus, the disparity, which is halfway across the second row 920, measures 4½ pixels.

Thus, the disparity is different in each of the resolutions of the rows 910, 920, and 930. The disparity varies from 4 pixels, to 4½ pixels, to 6 pixels.

When, however, the disparity is expressed in DU, this same object, at all three resolutions, has a disparity of 36 DU. This can be seen by examining the fourth row 940. As measured in the rescaled image of the fourth row 940, the object appears in the leftmost DU 942 of one image of a stereo-image pair, and precisely at a thirty-seventh DU 944 in the corresponding other-eye image of the stereo-image pair. Thus, the disparity, which is halfway across the fourth row 940, measures 36 DUs. By using DUs, rather than pixels, to measure the disparity, the disparity for this object need not be re-measured, re-calculated, or scaled as the picture is scaled among the different selected resolutions.

As explained earlier, a dense disparity map typically contains a disparity value associated with the content of each pixel in one image of a stereoscopic image pair (referred to as a stereo-image pair). The disparity value is relative to the other image in the stereo-image pair. Thus, a dense disparity map typically contains the same number of disparity entries as the corresponding image has pixels.

From a first dense disparity map for an image of high resolution (for example, 1920 pixels wide), a second dense disparity map for an image of lower resolution can be calculated by weighted average (or some other function) of the values in the first dense disparity map that spatially overlay values in the second dense disparity map.

In one implementation, the disparity downscaling function is a weighted average. In this implementation, a value in the second dense disparity map is equal to a sum of products. The products that are summed are the products of the disparity corresponding to each pixel in first map times the area (normalized to pixels of the second map) of the intersection of its corresponding pixel with that of the second map pixel for which the disparity value is being computed.

Figure 10:
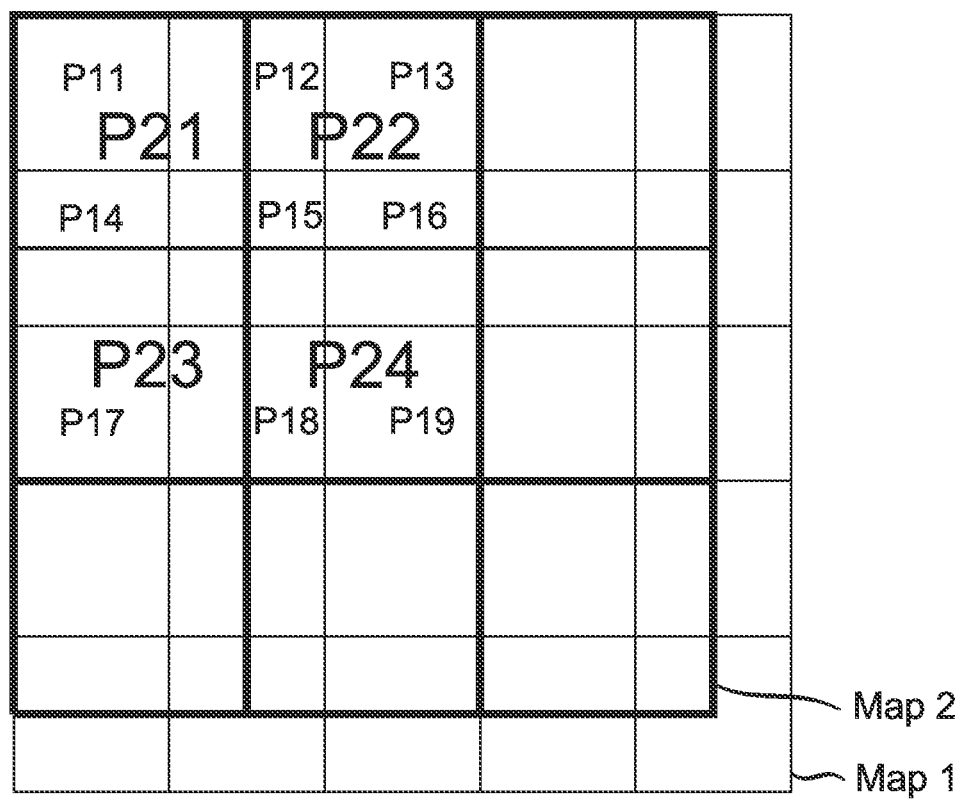
FIG. 10 is a block/pictorial representation of two examples of pixel grids for different resolutions.

For example, with respect to FIG. 10, there is shown a portion of an overlap of two pixel grids. A first pixel grid is referred to as a Map 1, and is a pixel grid for a higher resolution picture. A second pixel grid is referred to as a Map 2, and is a pixel grid for a lower resolution picture. It should be clear that the Map 1 and the Map 2 are not shown in their entirety in FIG. 10. FIG. 10 shows a portion of the overlap of the Map 1 and the Map 2.

The grids of FIG. 10 also correspond to disparity maps. A first disparity map provides a disparity value for each pixel location in the Map 1, and is referred to at times as the Map 1 disparity map. A second disparity map provides a disparity value for each pixel location in the Map 2, and is referred to at times as the Map 2 disparity map. The Map 1 disparity map is a dense disparity map for the higher resolution picture, and is referred to at times as a higher resolution disparity map. The Map 2 disparity map is a dense disparity map for the lower resolution picture, and is referred to at times as a lower resolution disparity map. In various implementations that follow, the Map 2 disparity map is created by downscaling the Map 1 disparity map, and, conversely, the Map 1 disparity map is created by upscaling the Map 2 disparity map.

Referring to FIG. 11, the Map 1 of FIG. 10 is also shown in FIG. 11 in isolation without the Map 2. Similarly, referring to FIG. 12, the Map 2 of FIG. 10 is also shown in FIG. 12 in isolation without the Map 1. It should be clear that disparity maps, as generally used in this application, include disparity values for a corresponding picture. A disparity map is typically considered to have disparity values for pixels (or groups of pixels) in a corresponding picture. Accordingly, it is convenient at times to refer the disparity map as having pixels, particularly for a dense disparity map that has a disparity value for every pixel in the corresponding picture.

The Map 1 (in both FIGS. 10 and 11) shows a pixel grid for a corresponding picture that has a pixel P11, a pixel P12, a pixel P13, a pixel P14, a pixel P15, a pixel P16, a pixel P17, a pixel P18, and a pixel P19. The Map 2 (in both FIGS. 10 and 12) shows a pixel grid for a corresponding picture that has a pixel P21, a pixel P22, a pixel P23, and a pixel P24. As can be seen, the size of the pixels in the grid of the Map 1 is smaller than the size of the pixels of the grid of the Map 2. The size difference reflects the fact that the Map 1 is for a higher resolution picture than the Map 2.

In at least one implementation that forms the Map 2 disparity map from the Map 1 disparity map, the weighted average for the disparity value corresponding to the pixel P21 of the Map 2, will be a sum of products. The first product is the disparity value corresponding to the pixel P11 of the Map 1 (referred to as d(P11)) times the area of the intersection of the pixel P11 and the pixel P21. Note that the area of the pixel P21 is considered to be unity. The remaining products are similar for each disparity value of the Map 1 disparity map. However, only the pixel P11, the pixel P12, the pixel P14, and the pixel P15 have non-empty intersections with the pixel P21. Accordingly, only the pixel P11, the pixel P12, the pixel P14, and the pixel P15 contribute disparities to the disparity corresponding to the pixel P21. In equation form, the disparity of the pixel P21, using this weighted average disparity calculation is:

$$d(P21)=d(P11)*4/9+d(P12)*2/9+d(P14)*2/9+d(P15)*1/9.$$

Similarly, for pixel P24:

$$d(P24)=d(P15)*1/9+d(P16)*2/9+d(P18)*2/9+d(P19)*4/9.$$

The disparity of the pixel P22 and the pixel P23 is computed in a similar manner.

Another function may be chosen, rather than the weighted average. For example, another implementation defines the disparity downscaling function for the disparities of pixels in the new map to be the minimum of the disparities corresponding to pixels that intersect. In equation form, the disparity of the pixel P21, using this disparity minima (or "minimum disparity") calculation is:

$$d(P21)=\min(d(P11),d(P12),d(P14),d(15)).$$

For each particular pixel in the Map 2 (for example, the pixel P21), this disparity minima function guarantees that no disparity value from the Map 1 disparity map that contributes to the disparity value for that particular pixel in the Map 2 is less than the disparity value for that particular pixel in the Map 2. Recall that a lower disparity value indicates that the object is closer to the viewer. The disparity minima function thus provides a computed disparity map for a new resolution that ensures that an object is always at least as close to the viewer in the new resolution as the object was in an old resolution.

Conversely, in particular implementations the disparity minima function tends to give extra influence to the most negative disparity. For example, in one implementation, the disparity values of the Map 1 disparity map are all large except for the disparity value corresponding to the pixel P15 which has a small disparity value. Nonetheless, the disparity value for the pixel P15 will affect the disparity value for every pixel in the Map 2 that overlaps the pixel P15 in the Map 1, which includes the pixel P21, the pixel P22, the pixel P23, and the pixel P24. Recall that the Map 1 disparity map and the Map 2 disparity map are disparity maps for a picture. The result is that the portion of the picture considered to have the disparity value associated with the pixel P15 would grow by a factor of nine when the picture is changed from the higher resolution (the pixel grid of the Map 1) to the lower resolution (the pixel grid of the Map 2). That is because the four pixels in the Map 2 all at least partially overlay the pixel P15 in the Map 1, and the area of the Map 2 is nine times the area of the pixel P15.

Functions can also be applied to convert from the lower resolution of the Map 2 to the higher resolution of the Map 1. For example, a weighted average disparity calculation and/or a disparity minima calculation are used in various implementations. Such calculations follow the same principles as the earlier examples of these calculations. Note, however, that the pixels of the Map 1 are considered to be unity now, rather than the pixels of the Map 2.

In one such implementation, a weighted average disparity calculation for computing the disparity of the pixel P11 and the pixel P12 provides that:

$$d(P11)=d(P21),$$

because the pixel P21 completely overlays the pixel P11, and $$d(P12)=d(P21)*1/2+d(P22)*1/2,$$

because the pixel P12 is half-covered by the pixel P21, and half-covered by the pixel P22.

In another such implementation, a disparity minima calculation for computing the disparity of the pixel P15 provides that:

$$d(P15)=\min(d(P21),d(P22),d(P23),d(24)).$$

The above discussion of FIGS. 10, 11, and 12 all principally dealt with dense disparity maps. Indeed, there are cases, especially related to image processing to modify the apparent depth in a stereoscopic image pair, that require a dense disparity map for acceptable results.

However, there are other cases in which a dense disparity map is not needed, and in those cases a sparse disparity map (non-dense) is acceptable. For example, in order to position a subtitle (or a graphic, or an on-screen menu) to be composited with a stereoscopic presentation, one typically chooses a disparity for the subtitle/graphic/menu that is no greater than the minimum (most negative) disparity in the region it overlays.

A complete examination might test the disparity of every pixel overlaid by the subtitle/graphic/menu from a dense disparity map. However, a high quality result can typically be obtained by comparing the disparity of the subtitle/graphic/menu only to a sparse disparity map. In various implementations, such a sparse disparity map provides one disparity value for every two pixels, or every ten, or even more. The use of a sparse disparity map uses less data to represent a sparse disparity map. This results, for example, in less data for storage or transmission, and less data to be examined when trying to position the subtitle/graphic/menu.

Previously, when a picture is scaled to a different resolution, however, a sparse disparity map would be recalculated or rescaled in order to have proper correspondence between the disparities represented in the disparity map and the actual disparities of objects shown in the underlying pixels. For example, if you had a disparity map (dense or sparse) presented in whole or fractional pixel units, and you converted to a different resolution, you would typically a) scale the disparity values to the new differently sized pixel values and b) determine the disparity appropriate to the new scale, because each pixel (or region) presumably covers a different portion of the image than it used to cover. This may occur, for example, when a disparity map (sparse or dense) is converted to a different resolution requiring, for example, upsampling (also referred to as upconverting) or downsampling (also referred to as downconverting). Examples of this conversion are discussed earlier for a dense disparity map, for example, in conjunction with FIGS. 10-12. Note also that filtering may be required for various conversions to prevent or reduce, for example, aliasing.

Note that the previous examples of upsampling (for example, converting from the Map 2 to the Map 1) and downsampling (for example, converting from the Map 1 to the Map 2) dense disparity maps also apply to upsampling and downsampling sparse disparity maps. Several examples follow.

In various implementations, a sparse disparity map consists of disparity values only for selected and sparsely located pixels. Upon conversion to a different resolution, however, the selected and sparsely located pixels have areas of overlap with the pixels of the different resolution. Accordingly, in one implementation, upsampling and/or downsampling using (for example) a weighted average or minima function is used.

In another implementation, a sparse disparity map for a picture consists of disparity values that each apply to a separate cell (a group of pixels) from the picture. The separate cells cover the entire picture. Upon conversion to a different resolution, however, the separate cells will have areas of overlap with cells of the different resolution. Accordingly, in one implementation, upsampling and/or downsampling using (for example) a weighted average or minima function is used. One example of such an implementation can be seen in FIG. 10 when the pixels are considered to be cells and not single pixels. Thus, for example, the "pixel" P11 represents, in such an implementation, a cell (a group of pixels) and not just a single pixel, and a single disparity value (which is d(P11)) is associated with the entire cell.

However, in various implementations, a special sparse disparity map is constructed whose disparity values do not need to be recalculated to correspond with any of the predetermined resolutions. This scale-independent disparity map is constructed by selecting a width and a height for each cell as described below.

The width of each cell in the disparity map is selected to be equal to the SCM of the pixel widths of the various resolutions as measured in DU, or an integer multiple thereof. In one implementation, for the predetermined horizontal resolutions of 1280, 1440, and 1920, the reference display width in DU is their SCM of 11,520. This corresponds to a pixel that is 9 DU wide for the 1280 resolution, 8 DU wide for the 1440 resolution, and 6 DU wide for the 1920 resolution. The SCM of the pixel widths of 9 DU, 8 DU, and 6 DU is 72 DU. Thus, at horizontal intervals of 72 DU, the vertical pixel boundaries of the three picture resolutions align.

Using a similar process, the height of each cell is selected, thus providing an interval for the vertical axis. The video formats (also referred to as resolutions) from which the present example is constructed are 1280×720, 1440×1080, and 1920×1080. Note that the pixel aspect ratio in the 1280×720 and 1920×1080 formats is 1:1, but in the 1440×1080 format, the pixels have a wider 4:3 aspect ratio. Thus, this technique works for non-square pixels as well as square pixels.

Thus, the vertical resolutions are only two: 720 and 1080. The SCM of these two resolutions is 2160. This SCM is calculated, for example, in the same manner discussed earlier for calculating the horizontal SCM, noting that (i) $720=2^4*3^2*5$, (ii) $1080=2^3*3^3*5$, and (iii) $2160=2^4*3^3*5$. Thus, in this implementation, these three image formats have a height of 2160 VU (vertical units). For the image format that is 720 pixels tall, each pixel is 2160/720=3 VU tall. For the other image formats that are 1080 pixels tall, each pixel is 2160/1080=2 VU tall.

The height of each cell in the disparity map is selected to be equal to the SCM of the pixel heights of the various resolutions as measured in VU, or an integer multiple thereof. Therefore, for the above implementation, the height of each cell is the SCM of 3 VU and 2 VU, which is 6 VU.

We can combine the width and height calculations above. In such an implementation, a cell has a width of 72 DU (or an integer multiple thereof), and a height of 6 VU (or an integer multiple thereof). This implementation is illustrated in FIGS. 13-16, and discussed below.

Figure 13:
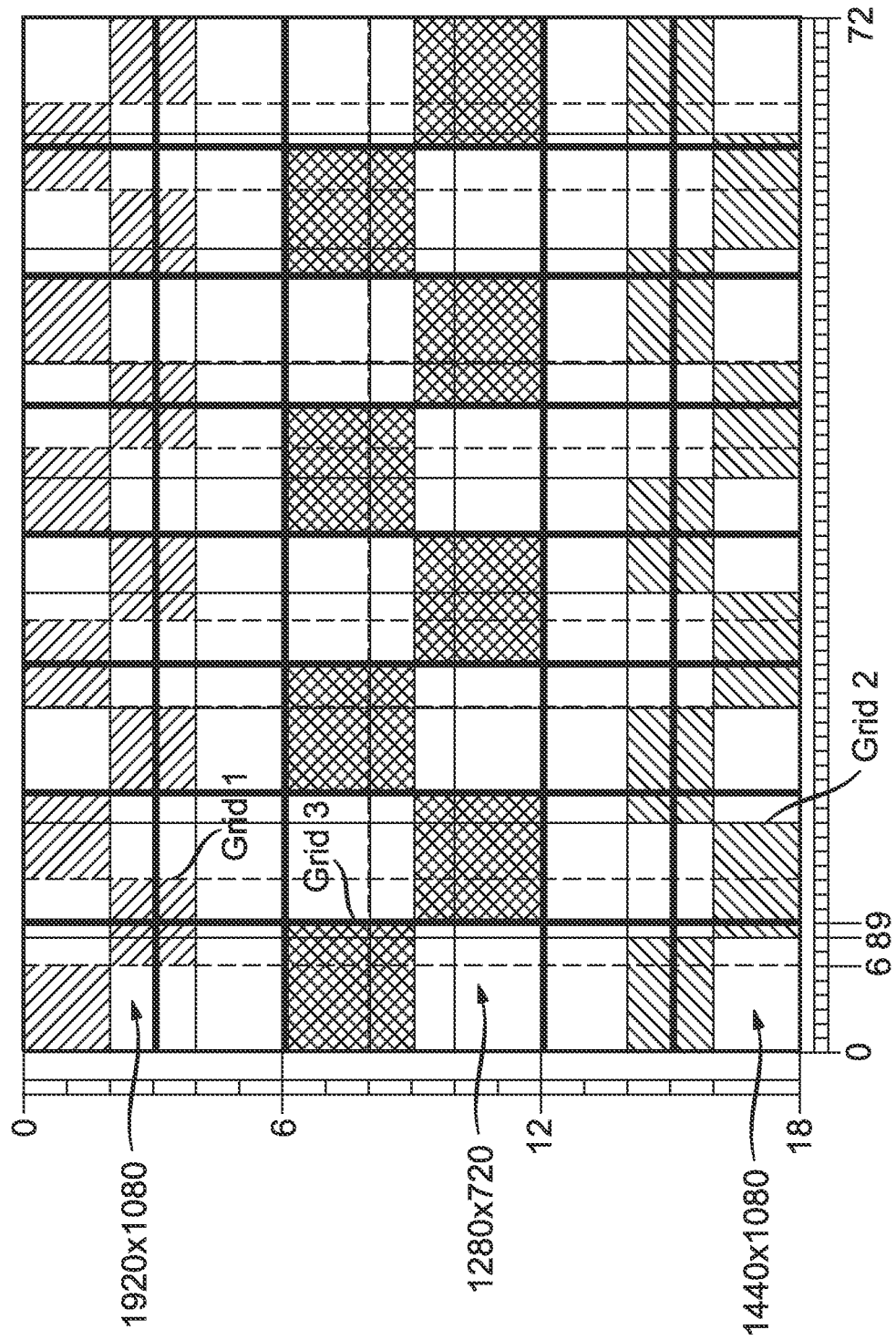
FIG. 13 is a block/pictorial representation of three further examples of pixel grids for different resolutions.
Figure 14:
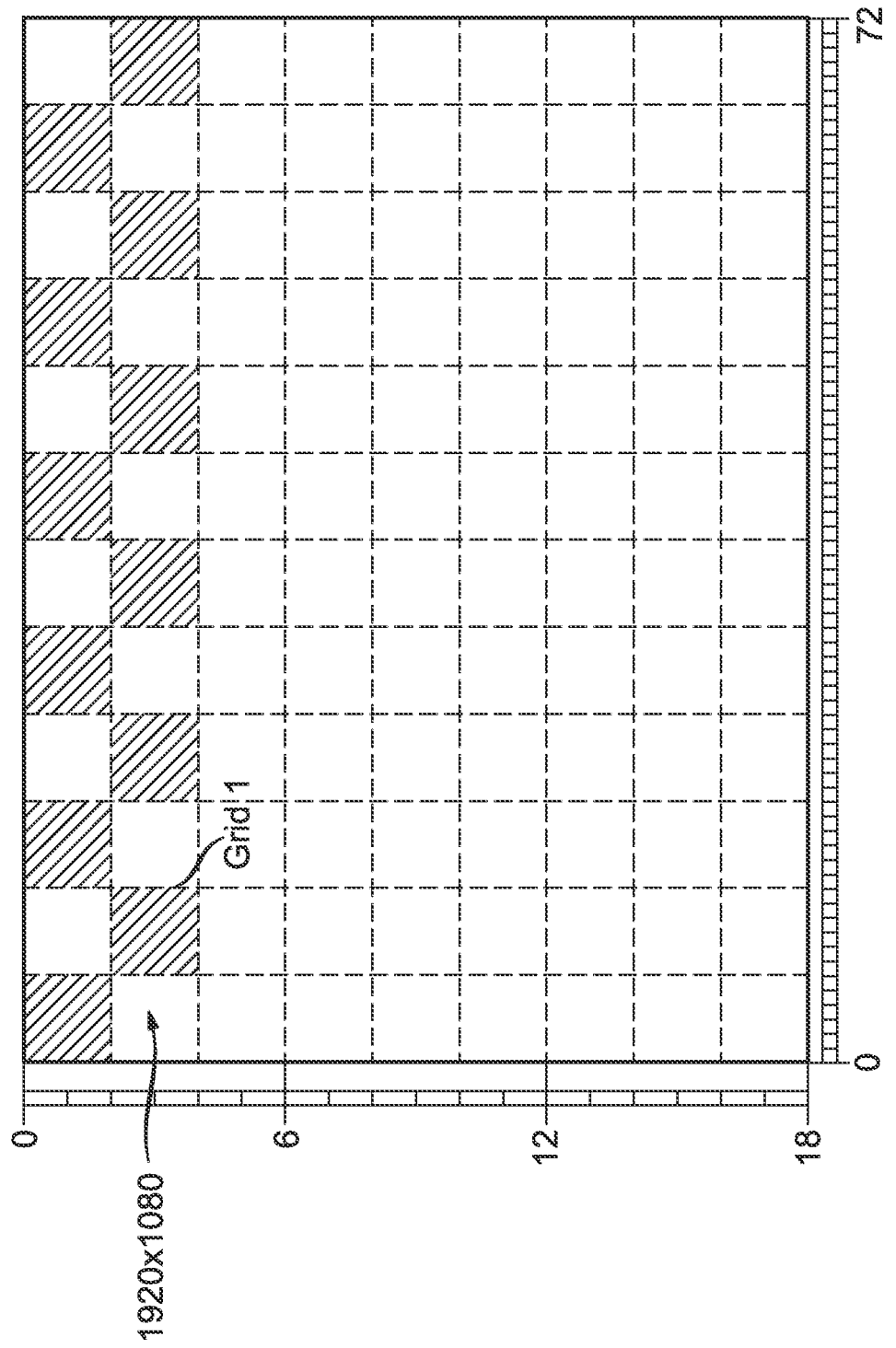
FIG. 14 is a block/pictorial representation of a first of the pixel grid examples of FIG. 13 in isolation.
Figure 15:
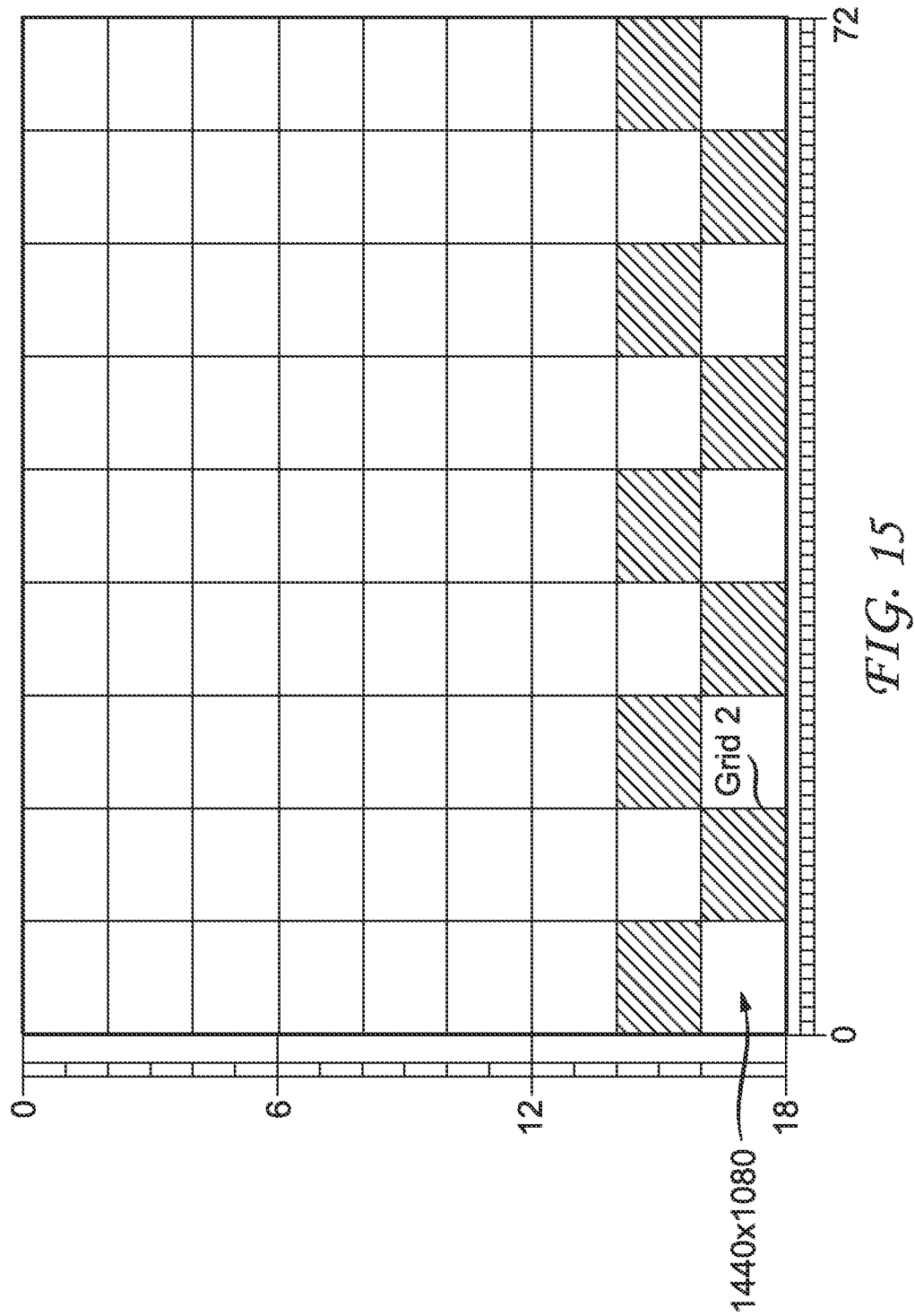
FIG. 15 is a block/pictorial representation of a second of the pixel grid examples of FIG. 13 in isolation.
Figure 16:
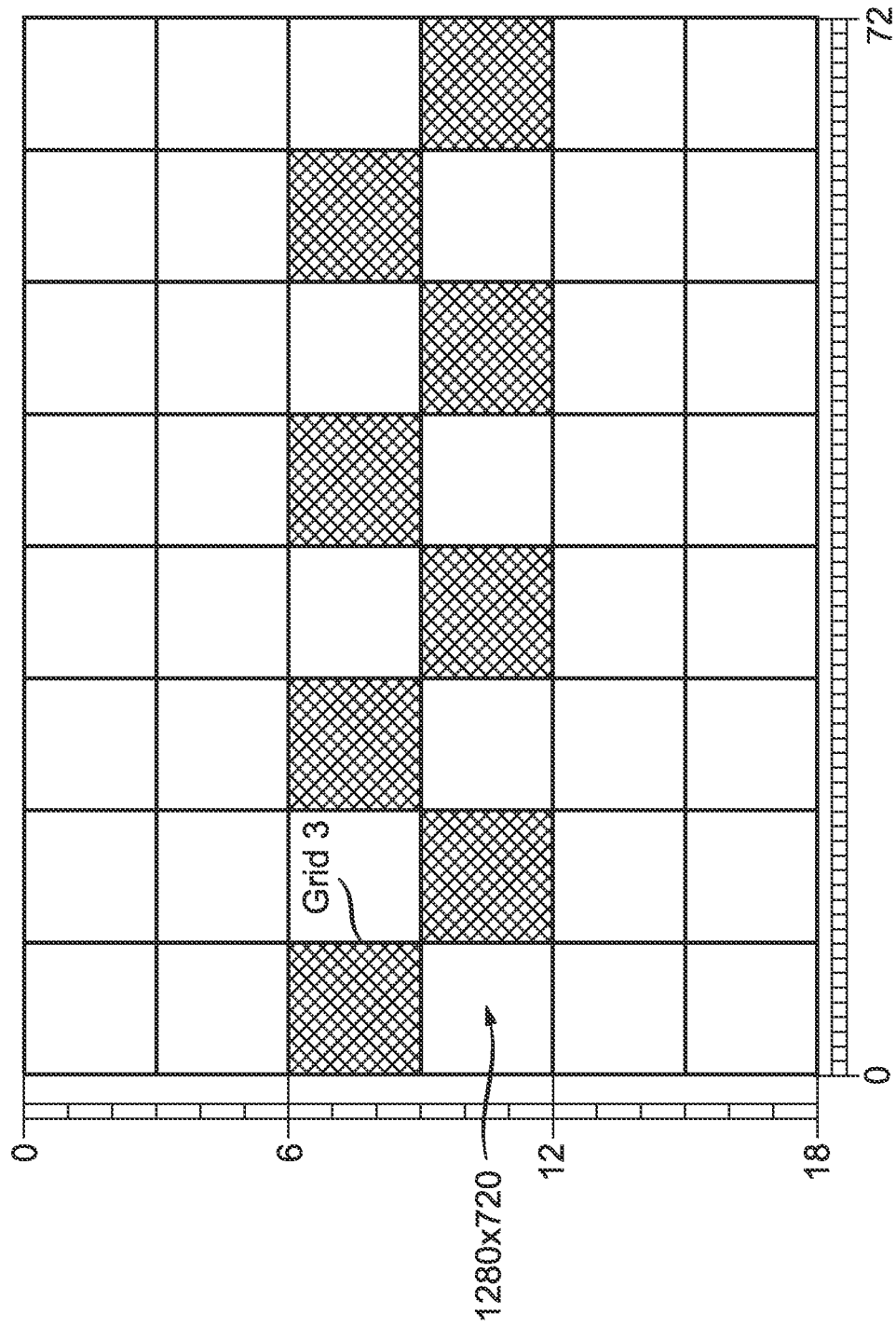
FIG. 16 is a block/pictorial representation of a third of the pixel grid examples of FIG. 13 in isolation.

Referring to FIGS. 13-16, a portion of three pixel grids is shown. A portion of a first pixel grid, referred to as a Grid 1 and drawn with left-diagonal strokes, is shown. A portion of second pixel grid, referred to as a Grid 2 and drawn with right-diagonal strokes, is shown. A portion of a third pixel grid, referred to as a Grid 3 and drawn with cross-hatching (that is, both left-diagonal strokes and right-diagonal strokes), is shown. The three portions are coextensive and, thus, represent the same portion of a picture. The fact that the three portions are coextensive is illustrated in FIG. 13 which shows the three portions overlaying one another. FIGS. 14-16, in contrast, show only one of the three portions. FIG. 14 shows the portion of the Grid 1 in isolation. FIG. 15 shows the portion of the Grid 2 in isolation. FIG. 16 shows the portion of the Grid 3 in isolation.

The three pixel grids have three different resolutions. The Grid 1 has a resolution of 1920×1080. The Grid 2 has a resolution of 1440×1080. The Grid 3 has a resolution of 1280×720. Thus, the Grid 1 has the highest horizontal resolution, and also has the highest total resolution. The Grid 3 has the lowest resolution (horizontal, vertical, and total). The Grid 2 has the middle horizontal resolution and total resolution. In each of the pixel grids, some pixels are shaded in the appropriate stroke to better illustrate the pitch of each grid. "Pitch" is understood to refer generally to the pixel size and location, the pixel spacing, or the spatial frequency.

FIGS. 13-16 also include vertical and horizontal axes showing, respectively, VU and DU units. The VU and DU unit sizes are determined as explained earlier for the three resolutions of FIGS. 13-16. Thus, each pixel in the Grid 1 is 6 DU wide by 2 VU tall. Each pixel in the Grid 2 is 8 DU wide by 3 VU tall. Each pixel in the Grid 3 is 9 DU wide by 3 VU tall.

As can be seen from FIG. 13, the vertical pixel boundaries for all three grids align every 6 VU (the SCM of 2 VU and 3 VU). The horizontal pixel boundaries for all three grids align every 72 DU (the SCM of 6 DU, 8 DU, and 9 DU).

Thus, for various implementations, a cell in a disparity map is defined as being a first integer multiple of 6 VU tall and a second integer multiple of 72 DU wide. The disparity value of the cell provides the disparity of objects in the pixels that correspond to the cell in any of the Grid 1, the Grid 2, or the Grid 3. In such implementations, the disparity value of the cell does not need to be recalculated when the picture is converted among the three resolutions of the Grid 1, the Grid 2, and the Grid 3. Rather, the disparity value of the cell applies at all of these three predetermined picture resolutions.

The resulting disparity map, divided into cells, will have a number of cell-columns that is equal to the picture width in DU divided by the cell width in DU. The number of cell-rows is equal to the picture height in VU divided by the cell height in VU.

In the example shown in FIG. 13, if the first and second integers multiplying the 6 VU and 72 DU are both "one", then the grid portions shown in FIG. 13 will correspond to three scale-independent disparity map cells, each cell being 72 DU wide and 6 DU tall. Note that this makes for a short, wide disparity map cell. Each of these three cells extends the entire width of FIG. 13. A first cell extends vertically from 0-6 VU. A second cell extends vertically from 6-12 VU. A third cell extends vertically from 12-18 VU.

Alternatively, if the first integer is "three" and the second integer is "one", then the portions of the three grids shown in FIG. 13 correspond to a single scale-independent disparity map cell. The horizontal and vertical axes of this single cell have a more similar representation than the cells of the above example in which the first integer is "one". Due to the more similar representation, the aspect ratio of cells in this example may be more effective for some purposes, depending, for example, on the size of the underlying data.

Note that DU and VU are not required to be the same size. In the example discussed with respect to FIG. 13, one VU is larger than one DU. This can be seen in FIG. 13, for example, in which the 72 horizontal increments are each one DU in width, and the 18 vertical increments are each one VU in height. The area that is 1 DU×1 VU (referred to as a "micropixel") is not square in this example, because the DU and the VU are not the same size. As we have discussed, the SCM of the horizontal resolutions may be used to set how many DU make up the horizontal width of an image. Likewise, such a calculation may be provided for the VU and the vertical height of the image. There is, in general, no requirement that the resulting micropixel of the hypothetical display be a square micropixel. This is because the size of a DU and the size of a VU may be different. Note that even though the micropixel is not square, the pixels of the Grid 1 and of the Grid 3 are square, while the pixels of the Grid 2 have a pixel aspect ratio of 4:3.

When a disparity map is provided as a scale-independent disparity map, the disparity map values can be used without alteration for the corresponding picture at any of the predetermined resolutions. Therefore, for example, the conversion process is not required.

Note that in various implementations a scale-independent disparity map is made up of cells that include only one pixel per cell. In several such implementations, the predetermined resolutions are integer multiples of each other. In these implementations, one pixel of the most coarse resolution corresponds to integer numbers of pixels for each of the other (less coarse) resolutions. In one particular implementation, one pixel of the most coarse resolution corresponds to four pixels in one of the finer (less coarse) resolutions.

Scale-independent disparity map cells provide a variety of advantages in different implementations. For example, in various implementations, scale-independent disparity map cells eliminate any need to convert disparity values when the resolution is changed. As another example, in various implementations, scale-independent disparity map cells maintain the correspondence between the disparity values and the associated content (for example, objects) to which the disparity values apply. These advantages are further discussed below.

We address the conversion of disparity values first. Referring again to FIG. 10, assume that a cell size is selected so as to be coextensive with a group of pixels defined to consist of the pixels P11-P16. Upon conversion to the resolution of the Map 2, it is clear that the boundaries of the Map 1 cells do not perfectly line up with any possible (full-pixel) cell boundaries in the Map 2. Thus, for example, the disparity value for the cell that includes the pixel P24 will presumably be based on the disparity for the Map 1 cell for P11-P16 as well as the disparity for the Map 1 cell that includes the pixels P18-P19. Such conversions require additional processing resources.

However, by providing cell boundaries that align on pixel boundaries in all resolutions, disparity values for the cells in all resolutions need not consider disparity values for regions outside of the cells. Additionally, the disparity values themselves are based on an SCM of the resolution, and therefore need not be converted to reflect a current (but non-final) resolution. Indeed, in various implementations, the disparity value need not be converted at any point prior to processing, such as, for example, subtitle placement.

We now address the correspondence between disparity values and content. Referring again to FIG. 10, assume that the pixels P11-P19, and the pixels P21-P24 are all cells rather than pixels. Assume further that the cell P15 has the lowest disparity and corresponds to pixels that include a foreground object. Upon conversion from the Map 1 to the Map 2, using a disparity minima calculation, the disparity of the cell P15 will be applied to the cells P21-P24. Upon a re-conversion back from the Map 2 to the Map 1, the disparity of the cells P21-P24 will be applied to all of the cells P11-P19. Thus, in two conversions, the disparity of the cell P15 has grown to the entire region of the cells P11-P19.

Such a two-conversion example may occur, for example, in a typical transmission environment. In one implementation, a picture is converted into the resolution used by a transmitter's processing chain (see, for example, the discussion of the processing chain 810). The received picture is then converted back into the original resolution (see, for example, the discussion of the video image 817). Indeed, other implementations include additional conversions. For example, in one implementation, (i) the received and converted picture is provided to a small-screen device (for example, a cell phone) that converts (third conversion) the picture to a lower resolution, (ii) a user then transmits the picture from the small-screen device, which involves a fourth conversion to a transmission resolution, and (iii) a friend of the user receives the transmission and converts the picture (fifth conversion) before displaying the picture.

As the number of conversions increases, the minimum disparity can incrementally grow to occupy more and more of the grid.

One impact of the growing reach of the minimum disparity is that subtitle placement can change. For example, in the original picture the object in the pixel P15 may be a foreground sidewalk of little interest. A person in the pixel P12 may be in the background, but the focus of attention. In the original picture, it may be that the subtitle is close-caption text, and is intended to be placed with an apparent depth similar to that of the person. However, after the two conversions described above, the indicated disparity of the person in the pixel P12 is now the same as the foreground sidewalk of the pixel P15. Accordingly, the close-caption text is going to be placed near the person but with an apparent depth that is the same as the sidewalk. Such a result can produce discomfort in a viewer.

Note that the above multiple-conversion implementations do provide various benefits. Additionally, various implementations use different disparity conversion functions that may provide additional benefits.

Note that some implementations use cells that are themselves isolated and not adjacent. In such implementations, the disparity values need not necessarily be associated with larger cell regions. For example, the cell size may be reduced. However, given that the cells of the different resolutions do not line up on all of the boundaries, there will typically be some mismatch of underlying content. Accordingly, such implementations typically provide some advantages, but not necessarily all of the advantages of the scale-independent disparity cells.

Figure 17:
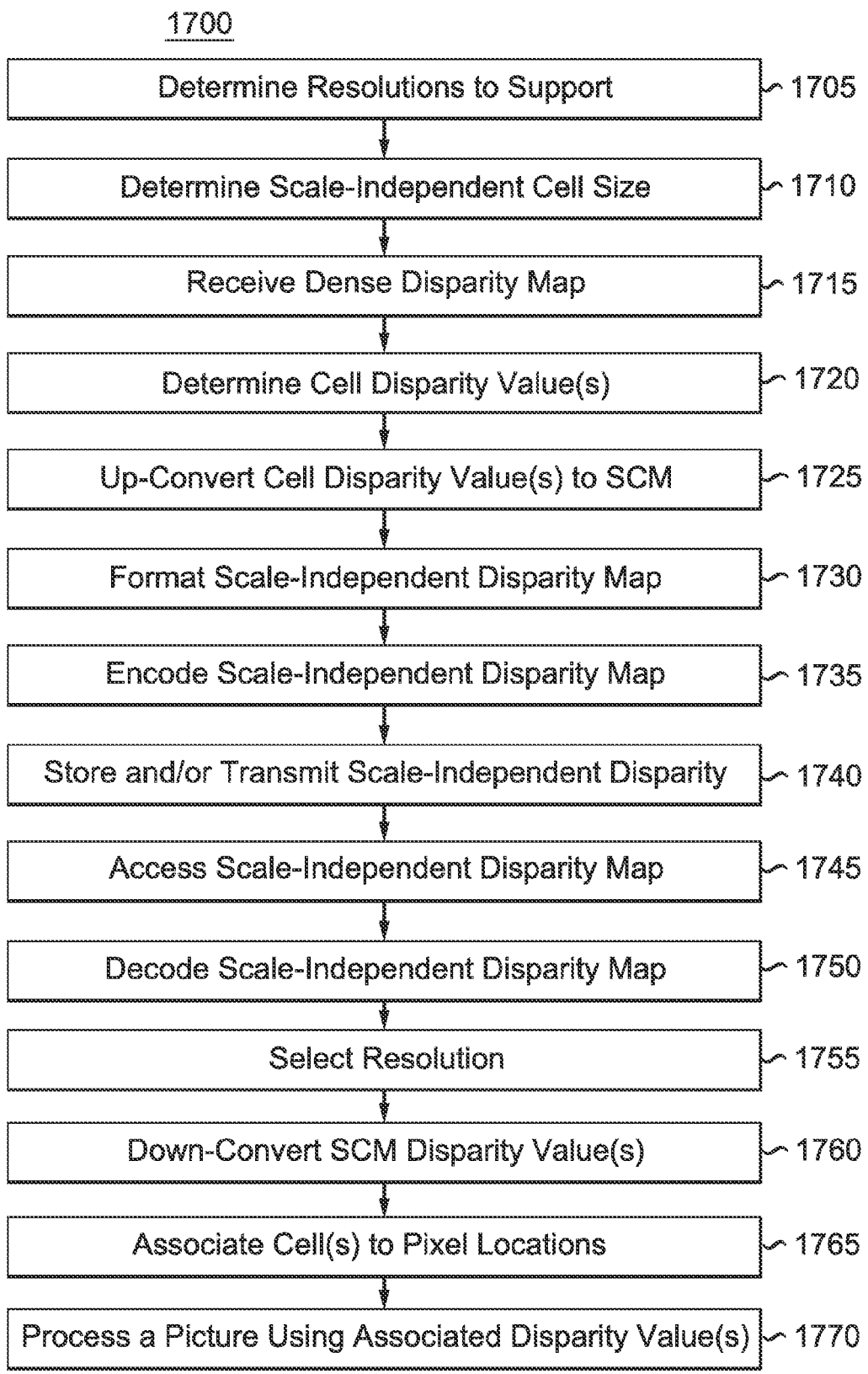
FIG. 17 is a block/flow diagram depicting an example of processing scale-independent disparity map values.

Referring to FIG. 17, a process 1700 is provided. The process 1700 addresses various aspects of the generation and use of a scale-independent disparity map.

The process 1700 includes determining which resolutions to support (1705). For example, in one or more implementations discussed in this application, the resolutions of 1280×720, 1440×1080, and 1920×1080 are supported.

The process 1700 includes determining a scale-independent cell size (1710). For example, for the three resolutions of 1280×720, 1440×1080, and 1920×1080, the smallest scale-independent cell size is 72 DU×6 VU based on an SCM resolution of 11,520×2160. A formula used in one or more implementations, for the smallest scale-independent cell size, is:

$$r = SCM\left(\bigcup_{i=1}^{N} \frac{SCM_{j=1}^{N}(R_j)}{R_i}\right)$$

where, for this example, $R_1$, $R_2$, and $R_3$ are either the horizontal or vertical resolutions of interest, N=3, and "r" is the number of units (in DU or VU, depending on whether horizontal or vertical is being considered). Thus, for the example horizontal resolutions of 1280, 1440, and 1920, the inner numerator becomes SCM (1280, 1440, 1920) which is 11,520, and the equation becomes:

$$r = SCM\left(\frac{11520}{1280}, \frac{11520}{1440}, \frac{11520}{1920}\right) = SCM(8, 9, 12) = 72$$

A similar calculation for the vertical resolutions results in 6. Accordingly, a scale-independent cell size may be selected with a width that is an integer multiple of (in this case) 72 DU, and a height that is an integer multiple of (in this case) 6 VU.

The process 1700 includes accessing a dense disparity map by, for example, receiving the dense disparity map (1715). Other implementations generate a dense disparity map by estimating disparity values, or by calculating disparity values based on depth values that are either received or estimated. Still other implementations do not access a dense disparity map.

The process 1700 includes determining one or more cell disparity values (1720). A cell disparity value is determined, for example, by using an averaging function or a minima function (as described in this application) on disparity values from a dense disparity map.

The process 1700 includes up-converting one or more cell disparity values to an SCM disparity value (1725). In one implementation, the cell disparity values determined in the operation 1720 are up-converted to SCM disparity values in this operation 1725. In a different implementation, pixel-based disparity values are up-converted to SCM disparity values prior to the operation 1720. Thus, in the different implementation, the one or more cell disparity values produced in the operation 1720 are already SCM disparity values, and the operation 1725 is omitted.

The process 1700 includes formatting a scale-independent disparity map (1730). The scale-independent disparity map is formatted in a variety of different manners in different implementations. Several examples follow, each of which formats the SCM-based scale-independent disparity values for the cells of a given disparity map.

In a first format implementation, it is understood that (i) only particular resolutions are supported, (ii) only a particular cell size is to be used, and (iii) cell disparity values are to be formatted in a particular cell order. Thus, for example, the DU and VU of the cell size, and the number of cells in the disparity map can be determined. In this first format implementation, a scale-independent disparity map is formed using the following pseudo-code:

```
for (i=0; i<"number of cells"; i++) {
    SCM-based scale-independent disparity for cell(i) }
```

In a second format implementation, different cell sizes are supported. However, for each cell size, the cell disparity values are to be formatted in a particular cell order. Accordingly, this second format implementation selects the cell size, which determines the number of cells in the disparity map. The cell size selection is indicated using a "cell size flag". For example, if four different cell sizes are supported, then a 2-bit flag is used to indicate the cell size selection. In this second format implementation, a scale-independent disparity map is formed using the following pseudo-code:

```
"cell size flag";
for (i=0; i<"number of cells"; i++) {
    SCM-based scale-independent disparity for cell(i) }
```

In a variation of the first format implementation, a full disparity map is formed using the first format implementation. However, an update can be formed that changes the disparity value of one or more cells, without forming an entirely new disparity map. In this variation, the "number of updated cells" and the "cell number" of each of these updated cells are provided. In this variation, an update to a scale-independent disparity map is formed using the following pseudo-code:

```
"number of updated cells";
for (i=0; i<"number of updated cells"; i++) {
    "cell number"(i);
    SCM-based scale-independent disparity for cell(i) }
```

In a third format implementation, only a limited number of cells are used. A particular cell size is assumed to be used, as in the first format implementation described above. However, disparity values are only calculated for those cells that include a feature of interest, such as, for example, a corner of an object, or an edge of an object. In this third format implementation, the "number of cells" used is determined, as well as a cell identifier. The cell identifier is, in one variation of this third format implementation, the coordinates of each cell, such as, for example, the coordinates of the top-left pixel and the bottom-right pixel in, for example, DUs and VUs. In another variation, the cell identifier is the "cell number". In yet other variations of this third format implementation, multiple cell sizes are available for use, and a "cell size flag" is used to indicate the selected cell size, as shown in the second format implementation described above. In one variation of this third format implementation, a scale-independent disparity map is formed using the following pseudo-code:

```
"number of cells";
for (i=0; i<"number of cells"; i++) {
    "cell number"(i);
    SCM-based scale-independent disparity for cell(i) }
```

The process 1700 includes encoding a scale-independent disparity map (1735). The scale-independent disparity map is, for example, an SCM-based disparity map, or a disparity map providing disparities produced for just a single display resolution.

The process 1700 includes storing and/or transmitting a scale-independent disparity map (1740). The scale-independent disparity map is, for example, an encoded SCM-based disparity map, an encoded non-SCM-based disparity map, an unencoded SCM-based disparity map, or an unencoded non-SCM-based disparity map. In certain applications, unencoded disparity maps are stored, and encoded disparity maps are transmitted. Thus, in one application, a formatted disparity map from the operation 1730 is stored and also encoded, and the encoded disparity map from the operation 1735 is transmitted.

The process 1700 includes accessing a scale-independent disparity map (1745). In one implementation, the operation 1745 occurs at a receiver that accesses a scale-independent disparity map by receiving a transmitted encoded scale-independent disparity map. In another implementation, the operation 1745 occurs at a post-processor that accesses a scale-independent disparity map by retrieving a stored scale-independent disparity map. The post-processor retrieves the disparity map in order to perform processing using the disparity map, such as, for example, determining the disparity and/or depth for a subtitle.

The process 1700 includes decoding a scale-independent disparity map (1750). In one implementation, the operation 1750 involves a receiver decoding an encoded scale-independent disparity map after receiving the disparity map over a transmission channel.

The process 1700 includes selecting a resolution (1755). In one implementation, a resolution is selected from among several supported resolutions. For example, a 1920 horizontal resolution is selected from among 1280, 1440, and 1920.

The process 1700 includes down-converting one or more SCM-based disparity values to a particular resolution (1760). In one implementation, an SCM-based scale-independent disparity map is down-converted to a resolution selected from among several resolutions supported by the SCM. For example, a disparity value based on the 11,520 SCM is down-converted to a 1920 horizontal resolution by dividing the disparity value by 6.

The process 1700 includes associating one or more cells with corresponding pixel locations (1765). In one implementation, SCM-based scale-independent disparity cells are mapped to corresponding pixel locations in a picture for a given resolution. Further, the given resolution is selected from among several resolutions supported by the SCM.

Such an implementation allows, for example, the disparity for a particular cell to be identified with specific pixel locations, and with objects represented at those pixel locations, in a corresponding picture. In one implementation, an SCM resolution of 11,520×2160 is used, along with a cell size of 72 DU×6 VU. In this implementation, a cell is identified by the (DU, VU) coordinates of its top-left corner, such as, for example, a cell beginning at (72 DU, 6 VU). The pixel locations associated with that cell are determined by dividing the (DU, VU) coordinates of the cell by the (DU, VU) size of a pixel. If the 1920×1080 resolution is selected, then as explained earlier, the pixel size is (6 DU, 2 VU). For this implementation, the pixel locations associated with the (72 DU, 6 VU) cell are the pixels starting at pixel location (12, 3) and extending to (but not including) pixel location (24, 6).

The process 1700 includes processing a picture using one or more associated disparity values (1770). In one implementation, disparity values from a disparity map are associated with pixel locations in a corresponding picture. The picture is part of a stereo-image pair of pictures, with each picture in the stereo-image pair including a subtitle. At least one of the pictures in the stereo-image pair is processed to provide an amount of disparity, for the subtitle, that is indicated by a disparity value associated with a pixel location of the subtitle.

Figure 18:
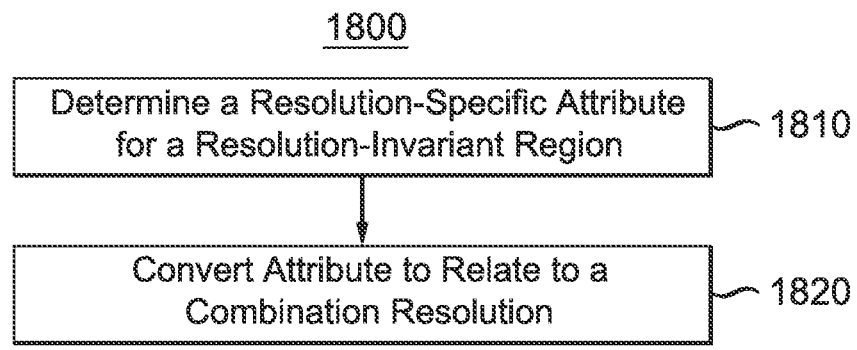
FIG. 18 is a block/flow diagram depicting an example of processing a resolution-specific attribute for a resolution-invariant region.

Referring to FIG. 18, a process 1800 is shown. The process 1800 includes determining a resolution-specific attribute for a resolution-invariant region (1810). A resolution-specific attribute is an attribute that has a value that is dependent on the resolution. Disparity is an example of an attribute that is dependent on the resolution.

Other resolution-specific attributes include, for example, "graininess" or "texture characteristics". Various texture characteristics are, in certain implementations, defined in terms of a number of pixels. For example, in one implementation, the mean grain size and standard deviation are defined in units of pixels. In another implementation, the pitch of a repetitious texture is defined in units of pixels.

Another resolution-specific attribute is, for example, certainty or confidence that is expressed in pixels. In one implementation, certainty/confidence expresses an expected error that is measured in pixels.

A resolution-invariant region is a region (of, for example, a picture) that is coextensive with a first integer number of pixels in a first resolution, and coextensive with a second integer number of pixels in a second resolution. The operation 1810 is performed, in one implementation, by the operation 1720 that determines one or more cell disparity values.

The process 1800 includes converting the attribute to relate to a combination resolution (1820). The combination resolution is a resolution determined as a combination of the first resolution and the second resolution. The converted attribute is specific to the region, and also specific to the combination resolution. The operation 1820 is performed, in one implementation, by the operation 1725 that up-converts one or more cell disparity values to an SCM disparity value.

Figure 19:
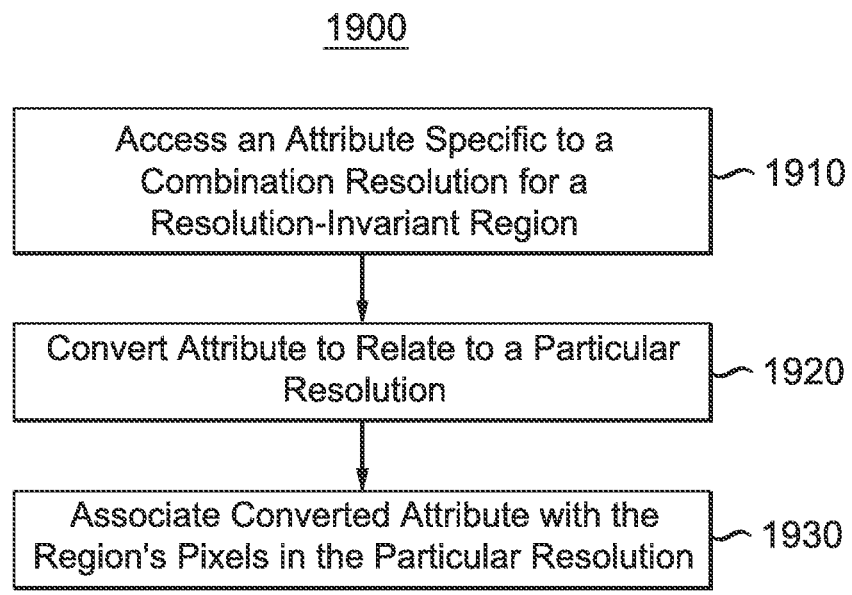
FIG. 19 is a block/flow diagram depicting another example of processing a resolution-specific attribute for a resolution-invariant region.

Referring to FIG. 19, a process 1900 is shown. The process 1900 includes accessing an attribute that is specific to a combination resolution for a resolution-invariant region of a picture (1910). The attribute has a value that is dependent on the resolution, and the attribute is specific to the combination resolution and to the region. Additionally, a resolution-invariant region is a region (of, for example, a picture) that is coextensive with a first integer number of pixels in a particular resolution, and coextensive with a second integer number of pixels in a second resolution. Further, the combination resolution is a resolution determined as a combination of the particular resolution and the second resolution. The operation 1910 is performed, in one implementation, by the operation 1745 that accesses a scale-independent disparity map.

The process 1900 includes converting the attribute so that it relates to a particular resolution (1920). The converted attribute is specific to the region and to the particular resolution. The operation 1920 is performed, in one implementation, by the operation 1760 that down-converts one or more SCM-based disparity values to a particular resolution.

The process 1900 includes associating the converted attribute with the region's pixels in the particular resolution (1930). The converted attribute is associated with the first integer number of pixels in the particular resolution. The operation 1930 is performed, in one implementation, by the operation 1765 that associates one or more cells with corresponding pixel locations.

Figure 20:
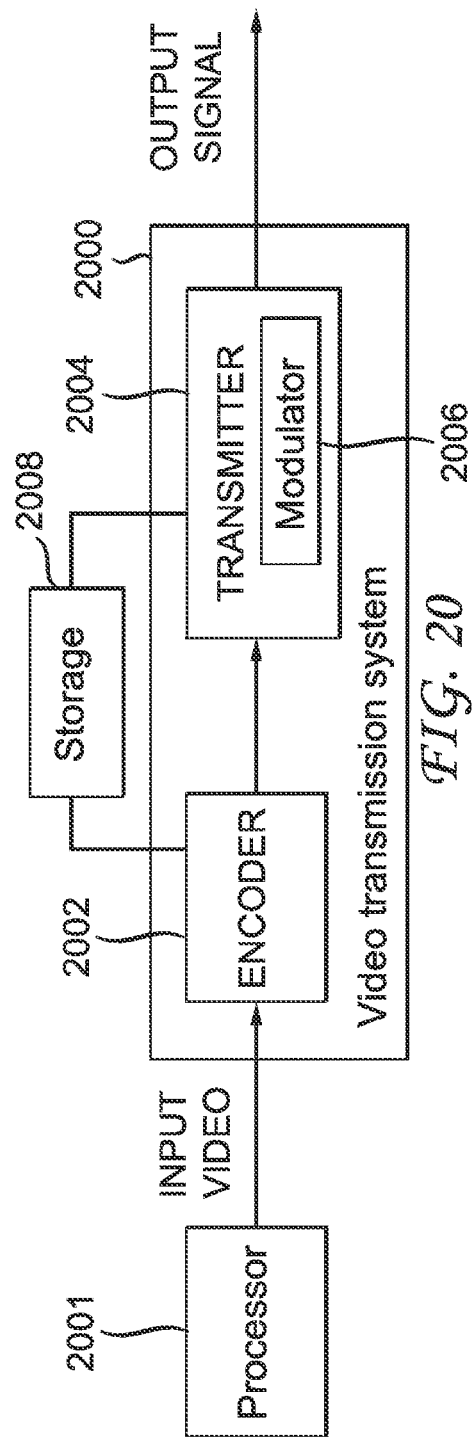
FIG. 20 is a block/flow diagram depicting an example of a transmission system that may be used with one or more implementations.

Referring now to FIG. 20, a video transmission system or apparatus 2000 is shown, to which the features and principles described above may be applied. The video transmission system or apparatus 2000 may be, for example, a head-end or transmission system for transmitting a signal using any of a variety of media, such as, for example, satellite, cable, telephone-line, or terrestrial broadcast. The video transmission system or apparatus 2000 also, or alternatively, may be used, for example, to provide a signal for storage. The transmission may be provided over the Internet or some other network. The video transmission system or apparatus 2000 is capable of generating and delivering, for example, video content and other content such as, for example, indicators of depth including, for example, depth and/or disparity values. It should also be clear that the blocks of FIG. 20 provide a flow diagram of a video transmission process, in addition to providing a block diagram of a video transmission system or apparatus.

The video transmission system or apparatus 2000 receives input video from a processor 2001. In one implementation, the processor 2001 simply provides original-resolution images, such as the disparity images 821, 831, 841 and/or the video image 811, to the video transmission system or apparatus 2000. However, in another implementation, the processor 2001 is a processor configured for performing filtering and down-sampling, for example, as described above with respect to the operations 812, 822, 832, 842 to produce images such as the video image 813 and/or the disparity images 823, 833, 843. In yet another implementation, the processor 2001 is configured for performing disparity conversion, such as, for example, the operation 850, to produce a disparity image with converted disparity values, such as, for example, the disparity image 860. In yet another implementation, the processor 2001 is configured for performing various operations of the process 1700, for example the operations 1705-1730. In yet another implementation, the processor 2001 is configured for performing all or part of the process 1800. The processor 2001 may also provide metadata to the video transmission system or apparatus 2000 indicating, for example, the horizontal resolution of an input image, the horizontal resolution upon which disparity values are based, whether disparity values are based on a percentage or a common multiple, and other information describing one or more of the input images.

The video transmission system or apparatus 2000 includes an encoder 2002 and a transmitter 2004 capable of transmitting the encoded signal. The encoder 2002 receives video information from the processor 2001. The video information may include, for example, video images, and/or disparity (or depth) images. The encoder 2002 generates an encoded signal(s) based on the video and/or disparity information. The encoder 2002 may be, for example, an AVC encoder. The AVC encoder may be applied to both video and disparity information. AVC refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard", the "H.264 standard", or simply "AVC" or "H.264").

The encoder 2002 may include sub-modules, including for example an assembly unit for receiving and assembling various pieces of information into a structured format for storage or transmission. The various pieces of information may include, for example, coded or uncoded video, coded or uncoded disparity (or depth) values, and coded or uncoded elements such as, for example, motion vectors, coding mode indicators, and syntax elements. In some implementations, the encoder 2002 includes the processor 2001 and therefore performs the operations of the processor 2001.

The transmitter 2004 receives the encoded signal(s) from the encoder 2002 and transmits the encoded signal(s) in one or more output signals. The transmitter 2004 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 2006. The transmitter 2004 may include, or interface with, an antenna (not shown). Further, implementations of the transmitter 2004 may be limited to the modulator 2006.

The video transmission system or apparatus 2000 is also communicatively coupled to a storage unit 2008. In one implementation, the storage unit 2008 is coupled to the encoder 2002, and is the storage unit 2008 stores an encoded bitstream from the encoder 2002. In another implementation, the storage unit 2008 is coupled to the transmitter 2004, and stores a bitstream from the transmitter 2004. The bitstream from the transmitter 2004 may include, for example, one or more encoded bitstreams that have been further processed by the transmitter 2004. The storage unit 2008 is, in different implementations, one or more of a standard DVD, a Blu-Ray disc, a hard drive, or some other storage device.

Figure 21:
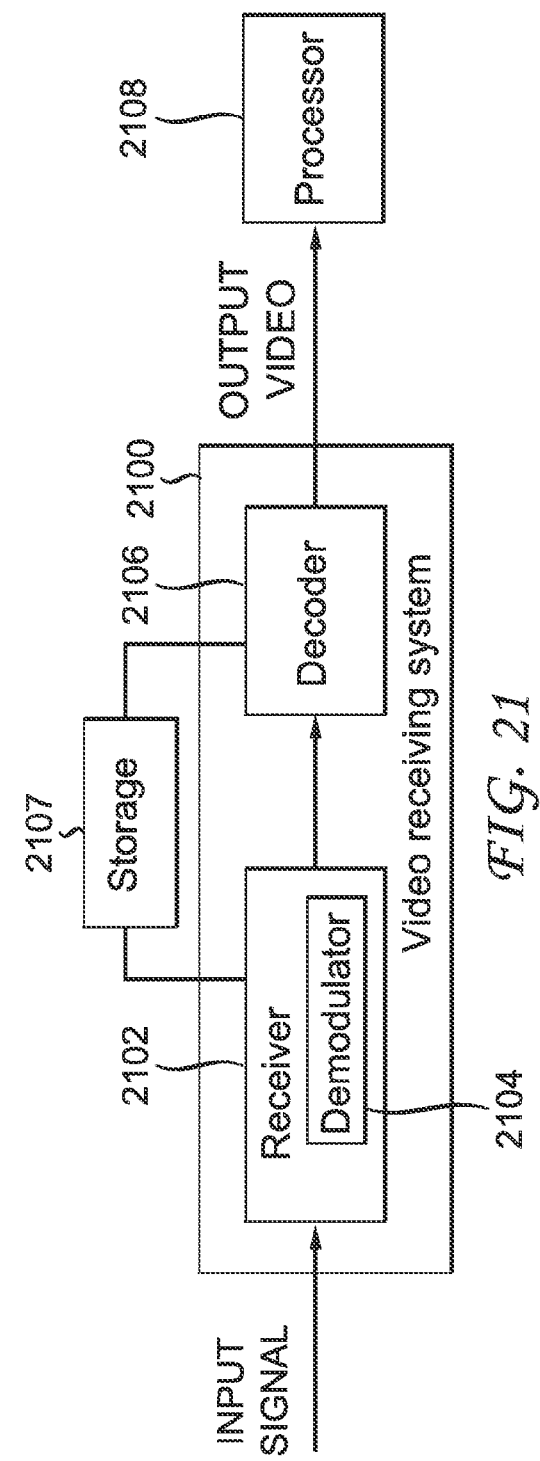
FIG. 21 is a block/flow diagram depicting an example of a receiving system that may be used with one or more implementations.

Referring now to FIG. 21, a video receiving system or apparatus 2100 is shown to which the features and principles described above may be applied. The video receiving system or apparatus 2100 may be configured to receive signals over a variety of media, such as, for example, satellite, cable, telephone-line, or terrestrial broadcast. The signals may be received over the Internet or some other network. It should also be clear that the blocks of FIG. 21 provide a flow diagram of a video receiving process, in addition to providing a block diagram of a video receiving system or apparatus.

The video receiving system or apparatus 2100 may be, for example, a cell-phone, a computer, a set-top box, a router, a television, or other device that receives encoded video and provides, for example, decoded video signal for display (display to a user, for example), for processing, or for storage. Thus, the video receiving system or apparatus 2100 may provide its output to, for example, a screen of a television, a computer monitor, a computer (for storage, processing, or display), or some other storage, processing, or display device.

The video receiving system or apparatus 2100 is capable of receiving and processing video information, and the video information may include, for example, video images, and/or disparity (or depth) images. The video receiving system or apparatus 2100 includes a receiver 2102 for receiving an encoded signal, such as, for example, the signals described in the implementations of this application. The receiver 2102 may receive, for example, a signal providing one or more of the video image 815 and/or the disparity image 825, or a signal output from the video transmission system 2000 of FIG. 20. In one implementation, the receiver 2102 receives a signal providing data formed according to one or more of the pseudo-code implementations discussed with respect to the operation 1730. In another implementation, the receiver 2102 receives a signal providing data from an output of the process 1800.

The receiver 2102 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 2104, de-randomizing the energy in the signal, de-interleaving the data in the signal, and error-correction decoding the signal. The receiver 2102 may include, or interface with, an antenna (not shown). Implementations of the receiver 2102 may be limited to the demodulator 2104.

The video receiving system or apparatus 2100 includes a decoder 2106. The receiver 2102 provides a received signal to the decoder 2106. The signal provided to the decoder 2106 by the receiver 2102 may include one or more encoded bitstreams. The decoder 2106 outputs a decoded signal, such as, for example, decoded video signals including video information. The decoder 2106 may be, for example, an AVC decoder.

The video receiving system or apparatus 2100 is also communicatively coupled to a storage unit 2107. In one implementation, the storage unit 2107 is coupled to the receiver 2102, and the receiver 2102 accesses a bitstream from the storage unit 2107. In another implementation, the storage unit 2107 is coupled to the decoder 2106, and the decoder 2106 accesses a bitstream from the storage unit 2107. The bitstream accessed from the storage unit 2107 includes, in different implementations, one or more encoded bitstreams. The storage unit 2107 is, in different implementations, one or more of a standard DVD, a Blu-Ray disc, a hard drive, or some other storage device.

The output video from the decoder 2106 is provided, in one implementation, to a processor 2108. The processor 2108 is, in one implementation, a processor configured for performing upsampling such as that described, for example, with respect to upsampling operations 816 and/or 826. In another implementation, the processor 2108 is configured for performing, for example, all or part of the operations 1755-1765, or the process 1900. In another implementation, the processor 2108 is configured for performing post-processing, such as, for example, the operation 1770, or post-processing using disparity values and related information provided, for example, by an output of the process 1900.

In some implementations, the decoder 2106 includes the processor 2108 and therefore performs the operations of the processor 2108. In other implementations, the processor 2108 is part of a downstream device such as, for example, a set-top box, a router, a computer, a tablet, or a television.

Other implementations are contemplated by the examples provided in this application. For example, an SCM for resolutions of 960×640, 1280×720, 1440×1080, and 1920×1080 is 11,520×17,280. The "17,280" is computed, for example, in the same manner as the 11,520 earlier in this application. "17,280" is equal to 640*27. This SCM produces pixel sizes of 12 DU×27 VU, 9 DU×24 VU, 8 DU×16 VU, and 6 DU×16 VU, respectively. These pixel sizes produce a scale-independent disparity map cell size of 72 DU (or an integer multiple)×432 VU (or an integer multiple).

Note that at least one implementation uses an extra bit to allow for 2 disparity maps to be generated. A first disparity map is computed with respect to a "left" view, and a second disparity map is computed with respect to a "right" view. Given that objects may be occluded, having two disparity maps allows for improved handling of occlusions. For example, by comparing the corresponding disparity values, a system can determine whether an occlusion exists, and if so, then take steps to fill the resulting hole. Additional implementations provide more disparity maps, and allocate an appropriate number of bits to accommodate the number of disparity maps. For example, in a multi-view context, such as for example MVC (which refers to AVC with the MVC extension (Annex G)), it may be desirable to transmit a set of disparity maps showing the calculated disparity from every view to every other view. Alternatively, an implementation may only transmit disparity maps with respect to a subset of views.

Disparity may be calculated, for example, in a manner similar to calculating motion vectors. Alternatively, disparity may be calculated from depth values, as is known and described above.

Various implementations also have advantages resulting from the use of disparity values instead of depth values. Such advantages may include: (1) disparity values are bounded, whereas depth values may go to infinity and so depth values are harder to represent/encode, (2) disparity values can be represented directly, whereas a logarithmic scaling is often needed to represent the potentially very large depth values.

Additionally, it is generally simple to determine depth from the disparity. Metadata is included in various implementations to provide information such as focal length, baseline distance (length), and convergence plane distance. Convergence plane distance is the distance at which the camera axes intersect when the cameras are converging. The point at which camera axes intersect can be seen in FIG. 4 as the vertex of the angle 410. When the cameras are parallel, the convergence plane distance is at infinite distance.

The implementations described in this application can be applied to a variety of attributes. One such attribute is disparity.

However, other implementations use other attributes that are resolution-specific. As described earlier, a resolution-specific attribute is an attribute that has a value that is dependent on the resolution. Disparity is an example of an attribute that is dependent on the resolution. Other examples include graininess and confidence.

Various implementations use attributes, such as, for example, depth, that are not resolution-specific. Such attributes are similar, in certain respects, to an SCM-based disparity value that need not be modified when the resolution is changed.

Various implementations are described that use weighted averaging or minima functions for determining disparity values during conversions between resolutions. Other implementations use different functions, such as, for example, non-weighted averaging, maxima (using the maximum disparity), mode, median, interpolation, or any of a variety of filtering functions.

It is noted that some implementations have particular advantages, or disadvantages. However, a discussion of the disadvantages of an implementation does not eliminate the advantages of that implementation, nor indicate that the implementation is not a viable and even recommended implementation.

Various implementations generate or process signals and/or signal structures. Such signals are formed, in certain implementations, using pseudo-code such as that described in the discussion of the operation 1730. Signals are produced, in various implementations, at the outputs of the processor 2001, the encoder 2002, the transmitter 2004, the receiver 2102, the decoder 2106, or the processor 2108. The signal and/or the signal structure is transmitted and/or stored (for example, on a processor-readable medium) in various implementations.

In a particular implementation, a signal or signal structure includes an attribute portion that includes data indicating an attribute for a region of a picture. The attribute is specific to the region and to a combination resolution. The combination resolution is determined as a combination of a particular resolution and a second resolution. The region of the picture is coextensive with a first integer number of pixels in the particular resolution, and coextensive with a second integer number of pixels in the second resolution.

Additionally, other implementations include portions in a signal or a signal structure for data relating to cell size, cell location, and other metadata. Such signals are, in various implementations, encoded in any of a variety of manners.

This application provides multiple block/flow diagrams, including the block/flow diagrams of FIGS. 6, 8, and 17-21. It should be clear that the block/flow diagrams of this application present both a flow diagram describing a process, and a block diagram describing functional blocks of an apparatus. Additionally, this application provides multiple pictorial representations, including the pictorial representations of FIGS. 1-5. It should be clear that the pictorial representations of this application present both (i) an illustration, a result, or an output, and (ii) a flow diagram describing a process. Additionally, this application provides at least the tabular representation in FIG. 7. It should be clear that the tabular representation provides a table of data, and also illustrates a process for obtaining disparity values at different resolutions. Additionally, this application provides multiple block/pictorial representations, including the block/pictorial representations of FIGS. 9-16. Is should be clear that the block/pictorial representations of this application present both a block diagram describing aspects of various data formats and resolutions, as well as a pictorial representation illustrating relationships among the components and outputs of the components.

Additionally, many of the operations, blocks, inputs, or outputs of the implementations described in this application are optional, even if not explicitly stated in the descriptions and discussions of these implementations. For example, as discussed earlier, any of the operations of the process 1700 can be omitted in various implementations. The mere recitation of a feature in a particular implementation does not indicate that the feature is mandatory for all implementations. Indeed, the opposite conclusion should generally be the default, and all features are considered optional unless such a feature is stated to be required. Even if a feature is stated to be required, that requirement is intended to apply only to that specific implementation, and other implementations are assumed to be free from such a requirement.

We thus provide one or more implementations having particular features and aspects. In particular, we provide several implementations relating to dense disparity maps, and also provide several implementations relating to sparse disparity maps. Dense disparity maps may allow a variety of applications, such as, for example, a relatively complex 3D effect adjustment on a consumer device. Sparse disparity maps may allow a variety of applications, such as, for example, a relatively simple sub-title placement in post-production. However, variations of these implementations and additional applications are contemplated and within our disclosure, and features and aspects of described implementations may be adapted for other implementations.

Note that the range of +80 to −150 pixels, for one or more particular display sizes, is used in at least one of the above implementations. However, in other implementations, even for those particular display sizes, a different disparity range is used that varies the end values of the range and/or the size of the range itself. In one implementation, a presentation in a theme park uses a more severe negative disparity (for example, to portray objects coming closer than half-way out from the screen) for more dramatic effects. In another implementation, a professional device supports a wider range of disparity than a consumer device.

Several of the implementations and features described in this application may be used in the context of the AVC Standard, and/or AVC with the MVC extension (Annex H), and/or AVC with the SVC extension (Annex G). Additionally, these implementations and features may be used in the context of another standard (existing or future), or in a context that does not involve a standard.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, evaluating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map.

Further, many implementations may refer to a "frame". However, such implementations are assumed to be equally applicable to a "picture" or "image".

A "depth map", or "disparity map", or "edge map", or similar terms are also intended to be broad terms. A map generally refers, for example, to a picture that includes a particular type of information. However, a map may include other types of information not indicated by its name. For example, a depth map typically includes depth information, but may also include other information such as, for example, video or edge information.

It is understood that a given display may support multiple different resolutions. Therefore, the given display may be able to display video content having a resolution of, for example, either 1280, 1440, or 1920. Nonetheless, the given display is often referred to as a 1920 display because the highest supported resolution is 1920. When a large display is displaying a small resolution image, the individual elements of the image may comprise multiple pixels. For example, if a display can support a horizontal resolution of 800 and 1920, then the display is typically at least 1920 pixels wide. When the display is displaying an 800 resolution image it is possible that the display allocates at least a portion of three or more pixels to each element of the image.

Various implementations use floating point representations of disparity values. Particular variations of such implementations use fixed point representations of the disparity values instead of floating point representations.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in one or more of an encoder (for example, the encoder 2002), a decoder (for example, the decoder 2106), a post-processor (for example, the processor 2108) processing output from a decoder, or a pre-processor (for example, the processor 2001) providing input to an encoder. The processors discussed in this application do, in various implementations, include multiple processors (sub-processors) that are collectively configured to perform, for example, a process, a function, or an operation. For example, the processor 2001 and the processor 2108 are each, in various implementations, composed of multiple sub-processors that are collectively configured to perform the operations of the respective processors 2001 and 2108. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants ("PDAs"), and other devices that facilitate communication of information between end-users. A processor may also include multiple processors that are collectively configured to perform, for example, a process, a function, or an operation. The collective configuration and performance may be achieved using any of a variety of techniques known in the art, such as, for example, use of dedicated sub-processors for particular tasks, or use of parallel processing.

Implementations of the various processes and features described herein may be embodied in a variety of different equipment or applications, particularly, for example, equipment or applications associated with data encoding, data decoding, view generation, depth or disparity processing, and other processing of images and related depth and/or disparity maps. Examples of such equipment include an encoder, a decoder, a post-processor processing output from a decoder, a pre-processor providing input to an encoder, a video coder, a video decoder, a video codec, a web server, a set-top box, a router, a laptop, a personal computer, a tablet, a cell phone, a PDA, and other communication devices. As should be clear, the equipment may be mobile and even installed in a mobile vehicle.

Additionally, the methods may be implemented by instructions being performed by a processor (or by multiple processors collectively configured to perform such instructions), and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
determining a single disparity value for a region of a picture, the picture having a particular resolution and the single disparity value being specific to the particular resolution and to the region, wherein the region of the picture is coextensive with a first integer number of pixels in the particular resolution, and coextensive with a second integer number of pixels in a second resolution, and wherein a size of the region is smaller than a size of the picture, the size of the region being based on a combination of (i) the first integer number of pixels in the particular resolution and (ii) the second integer number of pixels in the second resolution; and
converting the single disparity value to provide another single disparity value specific to the region and to a combination resolution determined as a combination of the particular resolution and the second resolution, wherein the another single disparity value is associated with the first integer number of pixels in the particular resolution.

2. The method of claim 1 wherein:
a region width is determined based on a multiple of pixel widths of pixels for resolutions in a set of resolutions that includes the particular resolution and the second resolution, and
a region height is determined based on a multiple of pixel heights of pixels for resolutions in the set of resolutions.

3. The method of claim 2 wherein:
the particular resolution comprises a particular horizontal resolution,
the second resolution comprises a second horizontal resolution,
the combination resolution comprises a combination horizontal resolution, and
the pixel width of a given resolution in the set of resolutions is based on the combination horizontal resolution divided by a horizontal resolution for the given resolution.

4. The method of claim 2 wherein:
the particular resolution comprises a particular vertical resolution,
the second resolution comprises a second vertical resolution,
the combination resolution comprises a combination vertical resolution, and the pixel height of a given resolution in the set of resolutions is based on the combination vertical resolution divided by a vertical resolution for the given resolution.

5. The method of claim 1 wherein the combination resolution is based on a multiple of at least the particular resolution and the second resolution.

6. The method of claim 1 wherein the particular resolution comprises a horizontal resolution, a vertical resolution, or both a horizontal resolution and a vertical resolution.

7. The method of claim 1 wherein determining the single disparity value comprises determining the single disparity value for the region based on disparity values for two or more pixels of the first integer number of pixels.

8. The method of claim 1 wherein:
determining the single disparity value comprises accessing the single disparity value from a disparity map.

9. The method of claim 1 further comprising inserting the another single disparity value for the region into a data structure suitable for at least one of storage or transmission.

10. The method of claim 9 further comprising inserting information into the data structure that indicates a region size and a region position.

11. The method of claim 1 further comprising determining a region size and a region position.

12. The method of claim 1 further comprising encoding the another single disparity value.

13. The method of claim 1 further comprising encoding information indicating a region size and a region position.

14. The method of claim 1 wherein converting includes multiplying the single disparity value by an integer reflecting a ratio of the combination resolution and the particular resolution.

15. An apparatus comprising one or more processors collectively configured to perform:
determining a single disparity value for a region of a picture, the picture having a particular resolution and the single disparity value being specific to the particular resolution and to the region, wherein the region of the picture is coextensive with a first integer number of pixels in the particular resolution, and coextensive with a second integer number of pixels in a second resolution, and wherein a size of the region is smaller than a size of the picture, the size of the region being based on a combination of (i) the first integer number of pixels in the particular resolution and (ii) the second integer number of pixels in the second resolution; and
converting the single disparity value to provide another single disparity value specific to the region and to a combination resolution determined as a combination of the particular resolution and the second resolution, wherein the another single disparity value is associated with the first integer number of pixels in the particular resolution.

16. An apparatus comprising:
means for determining a single disparity value for a region of a picture, the picture having a particular resolution and the single disparity value being specific to the particular resolution and to the region, wherein the region of the picture is coextensive with a first integer number of pixels in the particular resolution, and coextensive with a second integer number of pixels in a second resolution, and wherein a size of the region is smaller than a size of the picture, the size of the region being based on a combination of (i) the first integer number of pixels in the particular resolution and (ii) the second integer number of pixels in the second resolution; and
means for converting the single disparity value to provide another single disparity value specific to the region and to a combination resolution determined as a combination of the particular resolution and the second resolution, wherein the another single disparity value is associated with the first integer number of pixels in the particular resolution.

17. A non-transitory processor readable medium having stored thereon instructions for causing one or more processors to collectively perform:
determining a single disparity value for a region of a picture, the picture having a particular resolution and the single disparity value being specific to the particular resolution and to the region, wherein the region of the picture is coextensive with a first integer number of pixels in the particular resolution, and coextensive with a second integer number of pixels in a second resolution, and wherein a size of the region is smaller than a size of the picture, the size of the region being based on a combination of (i) the first integer number of pixels in the particular resolution and (ii) the second integer number of pixels in the second resolution; and
converting the single disparity value to provide another single disparity value specific to the region and to a combination resolution determined as a combination of the particular resolution and the second resolution, wherein the another single disparity value is associated with the first integer number of pixels in the particular resolution.

18. An apparatus comprising:
a processor configured to:
determine a single disparity value for a region of a picture, the picture having a particular resolution and the single disparity value being specific to the particular resolution and to the region, wherein the region of the picture is coextensive with a first integer number of pixels in the particular resolution, and coextensive with a second integer number of pixels in a second resolution, and wherein a size of the region is smaller than a size of the picture, the size of the region being based on a combination of (i) the first integer number of pixels in the particular resolution and (ii) the second integer number of pixels in the second resolution, and
convert the single disparity value to provide another single disparity value specific to the region and to a combination resolution determined as a combination of the particular resolution and the second resolution, wherein the another single disparity value is associated with the first integer number of pixels in the particular resolution; and
a modulator configured to modulate a signal with data indicating the another single disparity value.

19. A method comprising:
accessing a single disparity value for a region of a picture, wherein the region of the picture is coextensive with a first integer number of pixels in a particular resolution, and coextensive with a second integer number of pixels in a second resolution, the single disparity value being specific to the region and to a combination resolution determined as a combination of the particular resolution and the second resolution, and wherein a size of the region is smaller than a size of the picture, the size of the region being based on a combination of (i) the first integer number of pixels in the particular resolution and (ii) the second integer number of pixels in the second resolution;
converting the single disparity value to provide another single disparity value specific to the region and to the particular resolution; and
associating the another single disparity value with the first integer number of pixels in the particular resolution.

20. The method of claim 19 wherein:
a region width is based on a multiple of pixel widths of pixels for resolutions in a set of resolutions that includes the particular resolution and the second resolution, and
a region height is based on a multiple of pixel heights of pixels for resolutions in the set of resolutions.

21. The method of claim 20 wherein:
the particular resolution comprises a particular vertical resolution,
the second resolution comprises a second vertical resolution,
the combination resolution comprises a combination vertical resolution, and
the pixel height of a given resolution in the set of resolutions is based on the combination vertical resolution divided by a vertical resolution for the given resolution.

22. The method of claim 19 wherein:
the particular resolution comprises a particular horizontal resolution,
the second resolution comprises a second horizontal resolution,
the combination resolution comprises a combination horizontal resolution, and
the pixel width of a given resolution in the set of resolutions is based on the combination horizontal resolution divided by a horizontal resolution for the given resolution.

23. The method of claim 19 wherein the combination resolution is based on a multiple of at least the particular resolution and the second resolution.

24. The method of claim 19 wherein the particular resolution comprises a horizontal resolution, a vertical resolution, or both a horizontal resolution and a vertical resolution.

25. The method of claim 19 wherein accessing the single disparity value comprises accessing a bitstream including data formatted to provide the single disparity value for the region and other disparity values for one or more other regions of the picture.

26. The method of claim 19 wherein converting includes dividing the single disparity value by an integer reflecting a ratio of the combination resolution and the particular resolution.

27. The method of claim 19 wherein the single disparity value comprises an encoded disparity value, and the method further comprises decoding the encoded disparity value.

28. The method of claim 19 wherein associating comprises determining pixel locations for the first integer number of pixels in the particular resolution.

29. The method of claim 19 wherein a data structure has separate fields for each of the first number of pixels, and associating comprises inserting the another single disparity value into each of the separate fields.

30. An apparatus comprising one or more processors collectively configured to perform:
accessing a single disparity value for a region of a picture, wherein the region of the picture is coextensive with a first integer number of pixels in a particular resolution, and coextensive with a second integer number of pixels in a second resolution, the single disparity value being specific to the region and to a combination resolution determined as a combination of the particular resolution and the second resolution, and wherein a size of the region is smaller than a size of the picture, the size of the region being based on a combination of (i) the first integer number of pixels in the particular resolution and (ii) the second integer number of pixels in the second resolution;
converting the single disparity value to provide another single disparity value specific to the region and to the particular resolution; and
associating the another single disparity value with the first integer number of pixels in the particular resolution.

31. An apparatus comprising:
means for accessing a single disparity value for a region of a picture, wherein the region of the picture is coextensive with a first integer number of pixels in a particular resolution, and coextensive with a second integer number of pixels in a second resolution, the single disparity value being specific to the region and to a combination resolution determined as a combination of the particular resolution and the second resolution, and wherein a size of the region is smaller than a size of the picture, the size of the region being based on a combination of (i) the first integer number of pixels in the particular resolution and (ii) the second integer number of pixels in the second resolution;
means for converting the single disparity value to provide another single disparity value specific to the region and to the particular resolution; and
means for associating the another single disparity value with the first integer number of pixels in the particular resolution.

32. A non-transitory processor readable medium having stored thereon instructions for causing one or more processors to collectively perform:
accessing a single disparity value for a region of a picture, wherein the region of the picture is coextensive with a first integer number of pixels in a particular resolution, and coextensive with a second integer number of pixels in a second resolution, the single disparity value being specific to the region and to a combination resolution determined as a combination of the particular resolution and the second resolution, and wherein a size of the region is smaller than a size of the picture, the size of the region being based on a combination of (i) the first integer number of pixels in the particular resolution and (ii) the second integer number of pixels in the second resolution;
converting the single disparity value to provide another single disparity value specific to the region and to the particular resolution; and
associating the another single disparity value with the first integer number of pixels in the particular resolution.

33. An apparatus comprising:
a demodulator configured to demodulate a signal that includes data indicating a single disparity value for a region of a picture, wherein the region of the picture is coextensive with a first integer number of pixels in a particular resolution, and coextensive with a second integer number of pixels in a second resolution, the single disparity value being specific to the region and to a combination resolution determined as a combination of the particular resolution and the second resolution, and wherein a size of the region is smaller than a size of the picture, the size of the region being based on a combination of (i) the first integer number of pixels in the particular resolution and (ii) the second integer number of pixels in the second resolution; and a processor configured to:
  convert the single disparity value to provide another single disparity value specific to the region and to the particular resolution, and
  associate the another single disparity value with the first integer number of pixels in the particular resolution.

\* \* \* \* \*